Nov. 5, 1935.  A. KADOW ET AL  2,020,032
GLASS WORKING APPARATUS
Filed July 3, 1933  21 Sheets-Sheet 1

Inventors
August Kadow
and Willard L. Van Ness
By Barnett & Truman
Attorneys.

Nov. 5, 1935.  A. KADOW ET AL  2,020,032
GLASS WORKING APPARATUS
Filed July 3, 1933    21 Sheets-Sheet 2
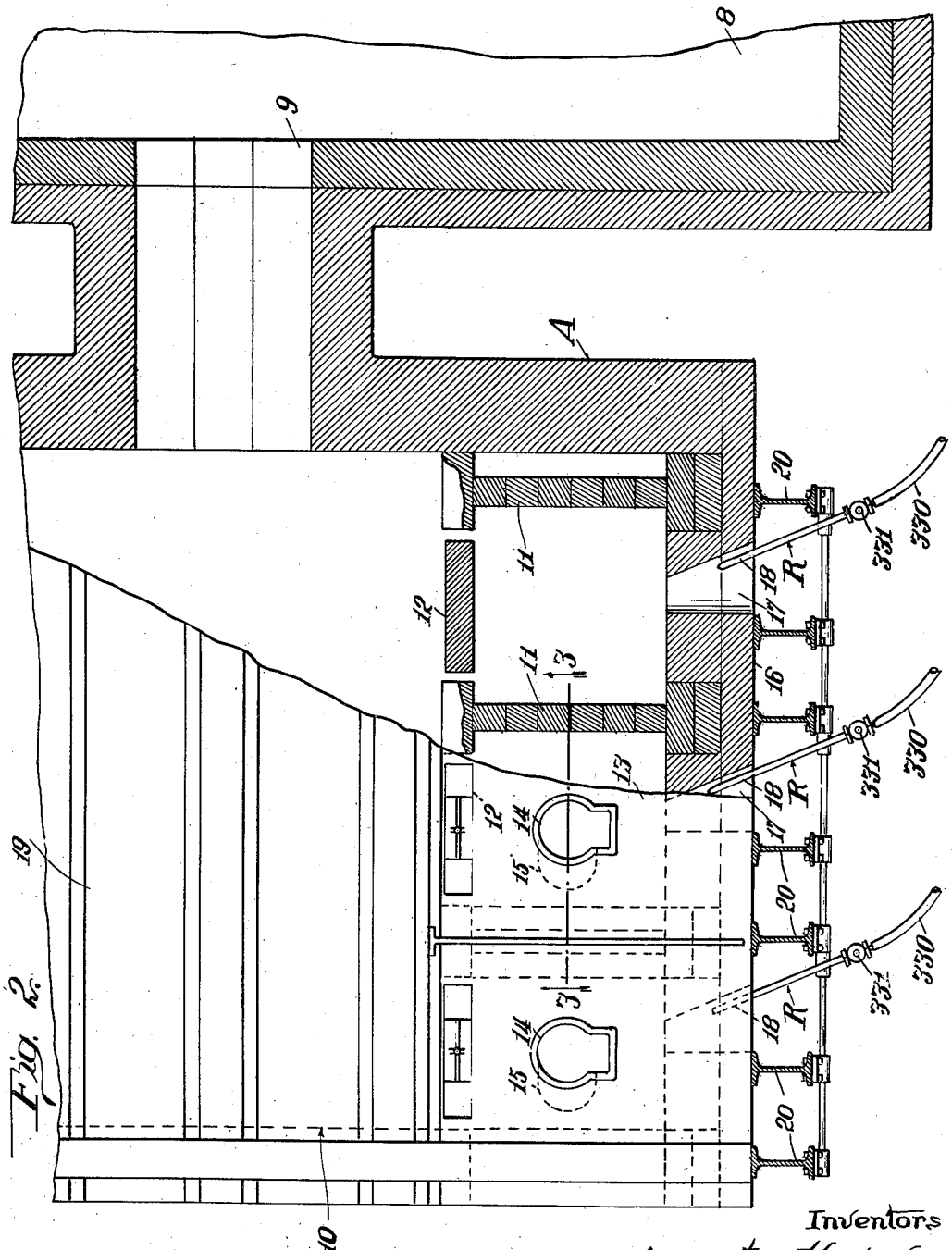
Inventors
August Kadow
and Willard L. Van Ness
By Barnett & Truman
Attorneys

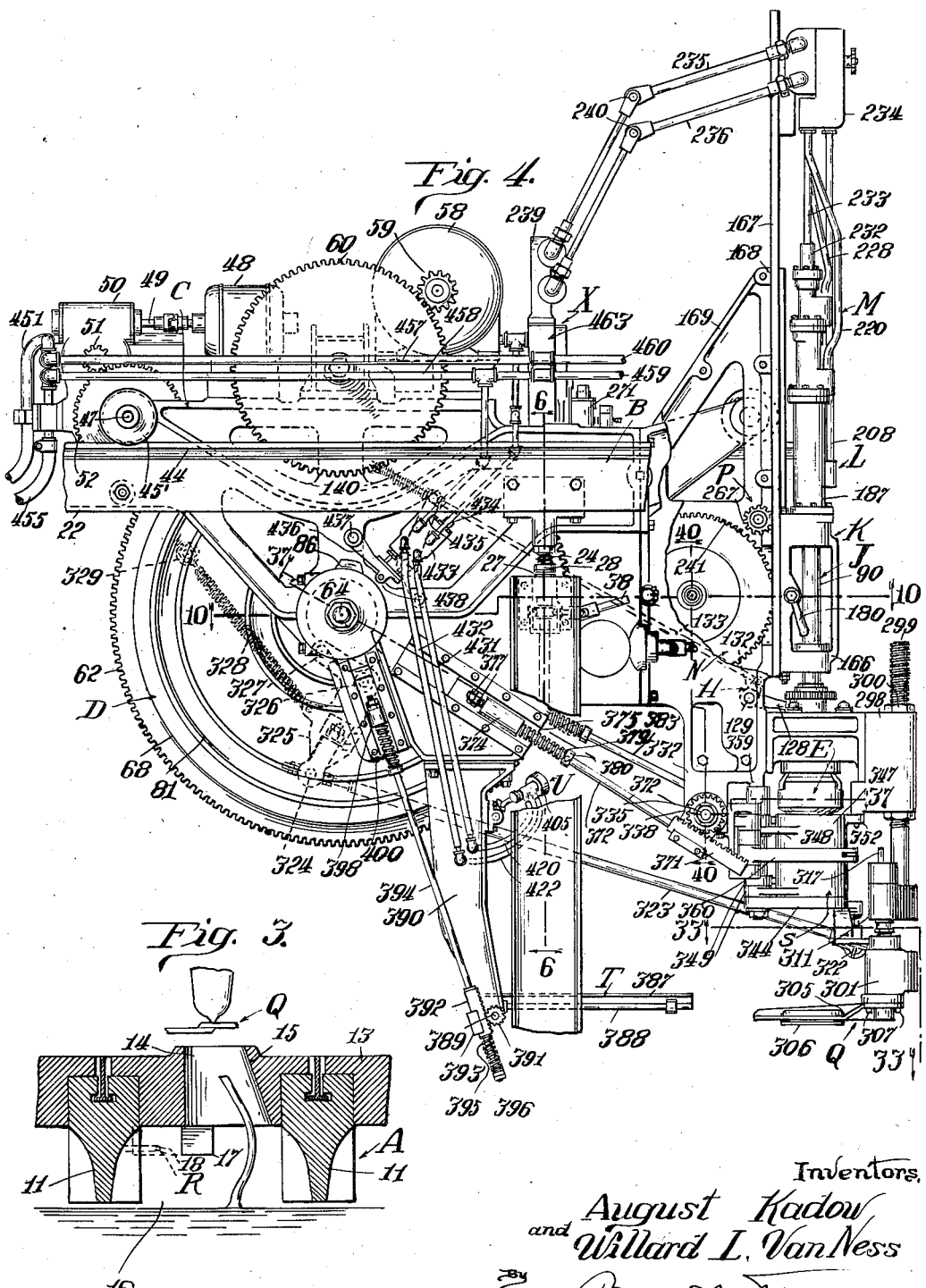

Nov. 5, 1935.   A. KADOW ET AL   2,020,032
GLASS WORKING APPARATUS
Filed July 3, 1933   21 Sheets-Sheet 4
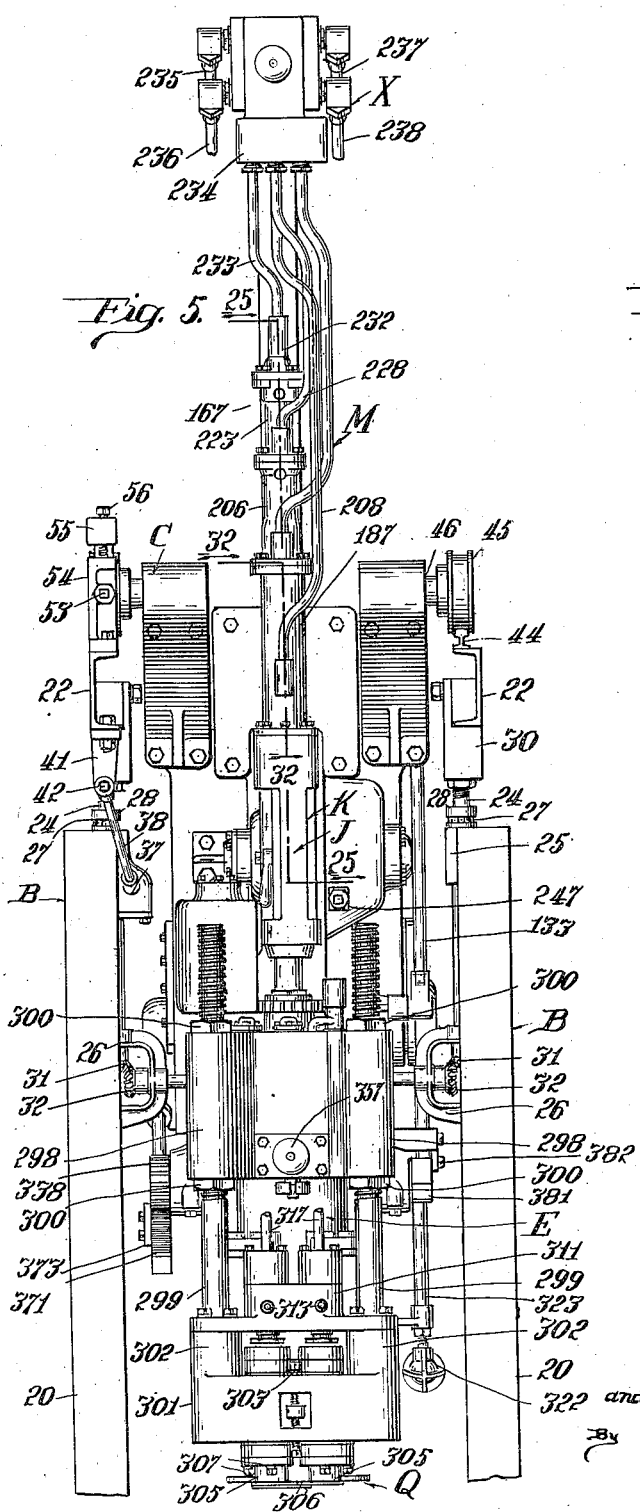
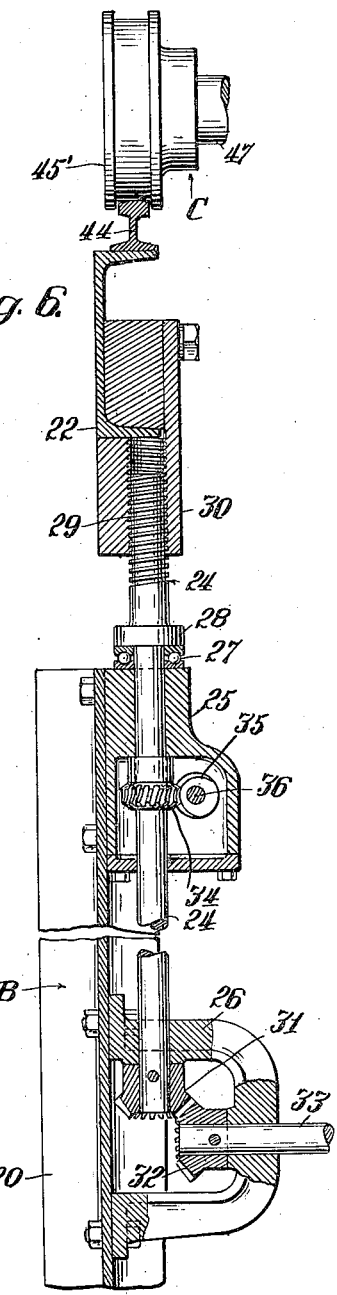
Inventors.
August Kadow
Willard L. Van Ness
Attorneys.

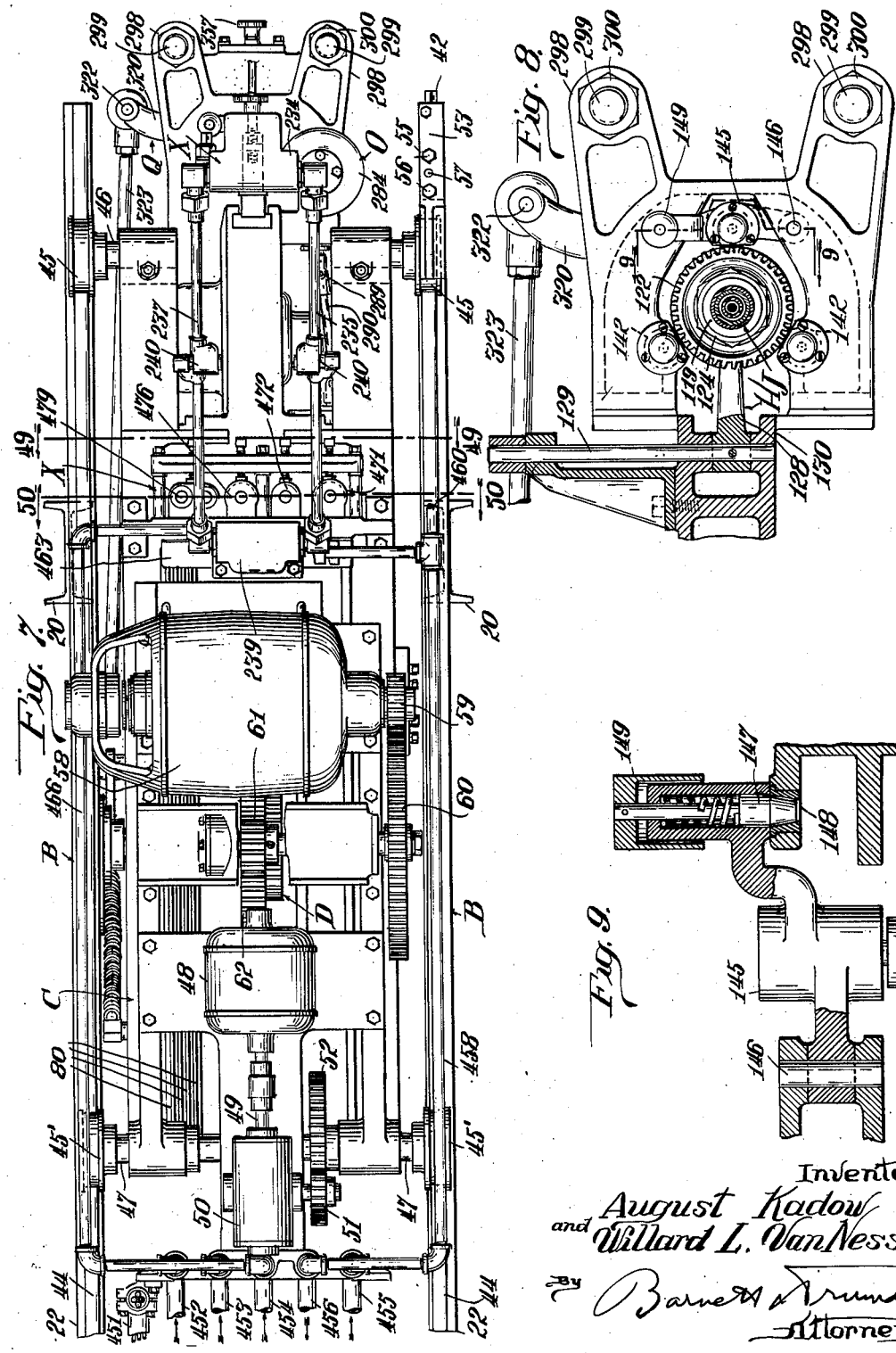

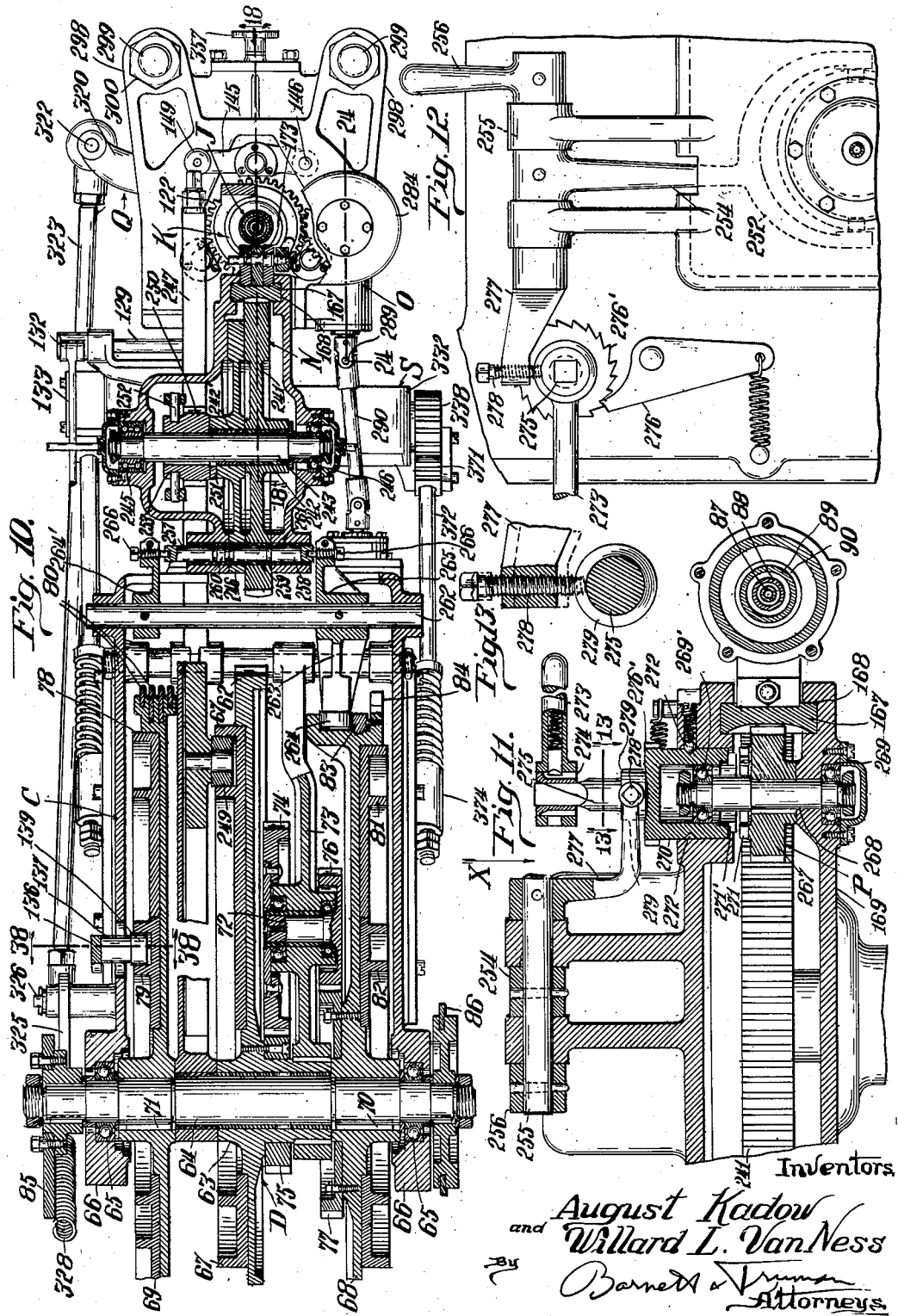

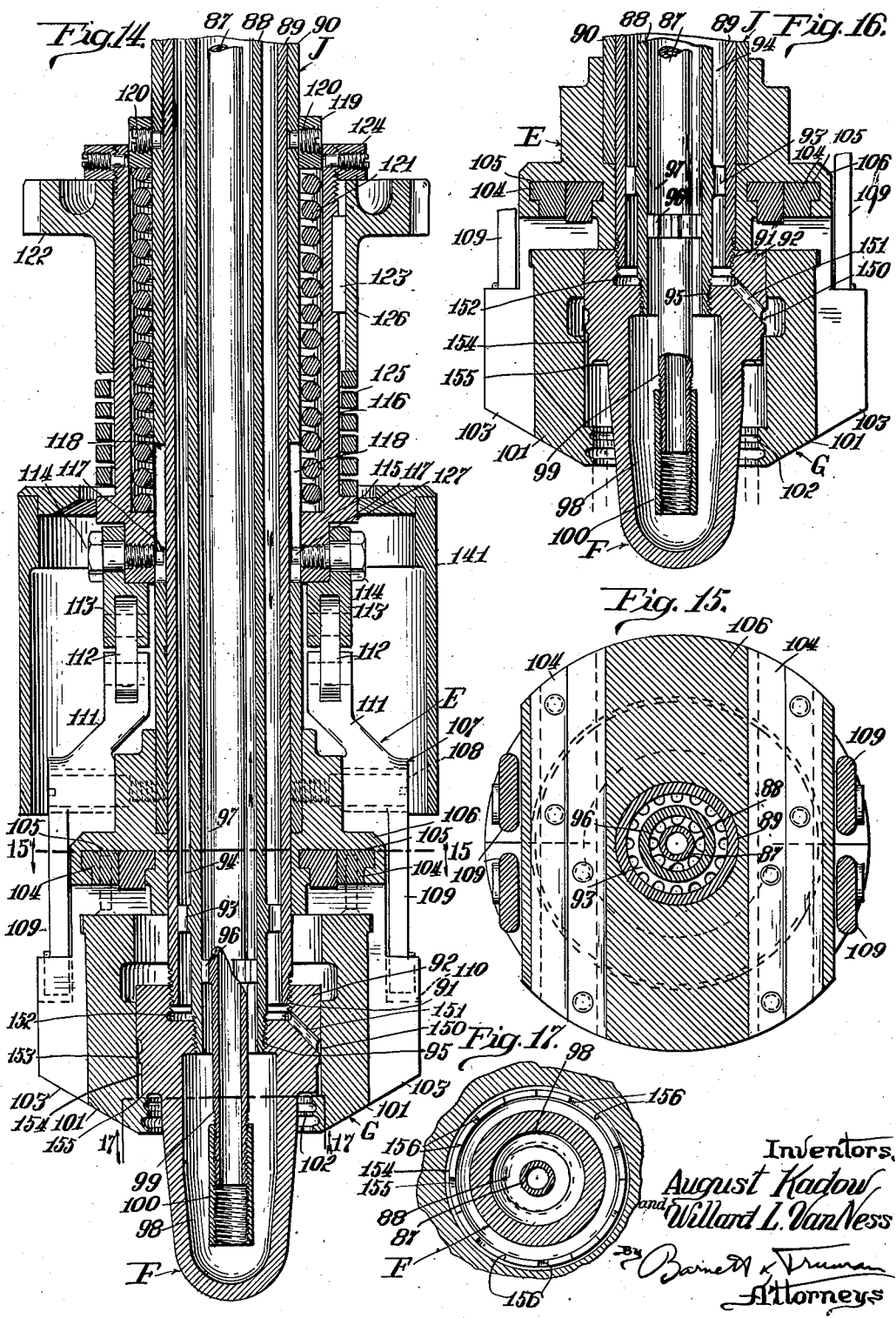

Nov. 5, 1935.  A. KADOW ET AL  2,020,032

GLASS WORKING APPARATUS

Filed July 3, 1933  21 Sheets-Sheet 8

Inventors
August Kadow
and Willard L. Van Ness
By
Attorneys.

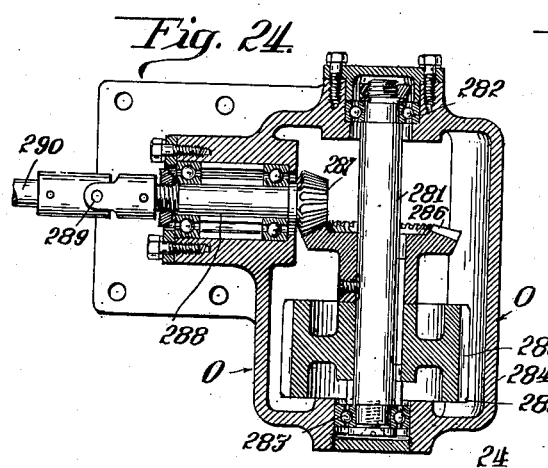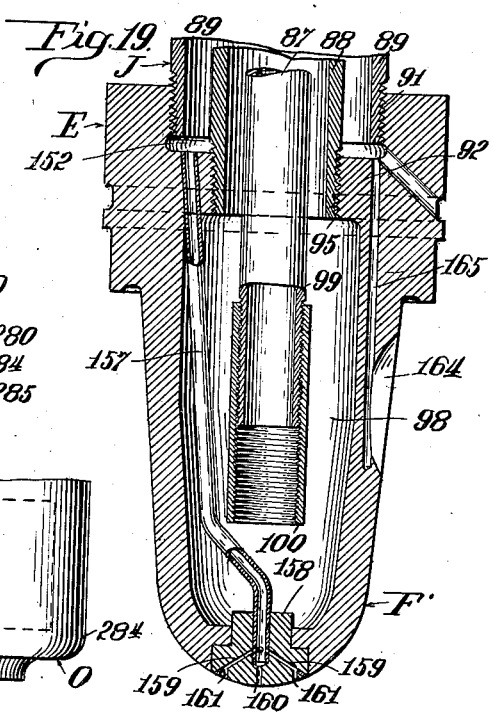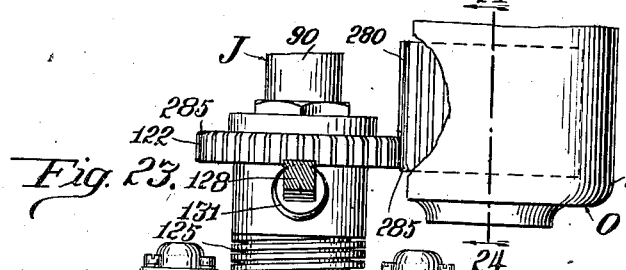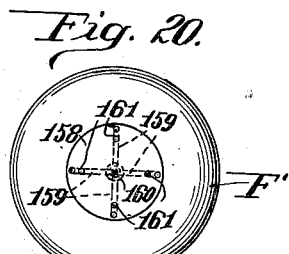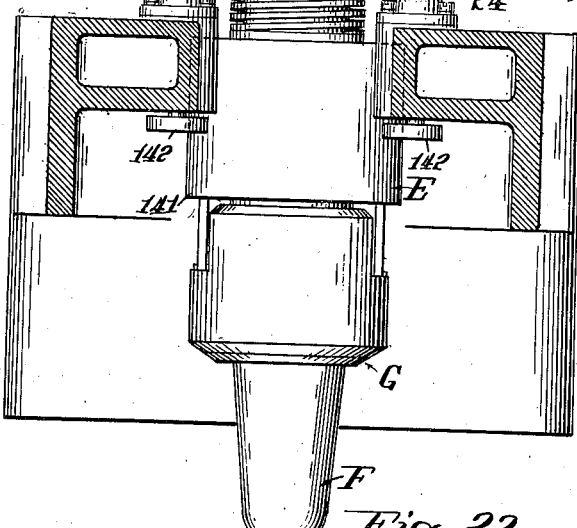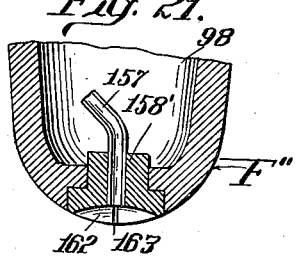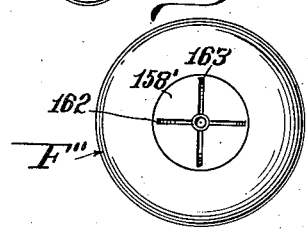

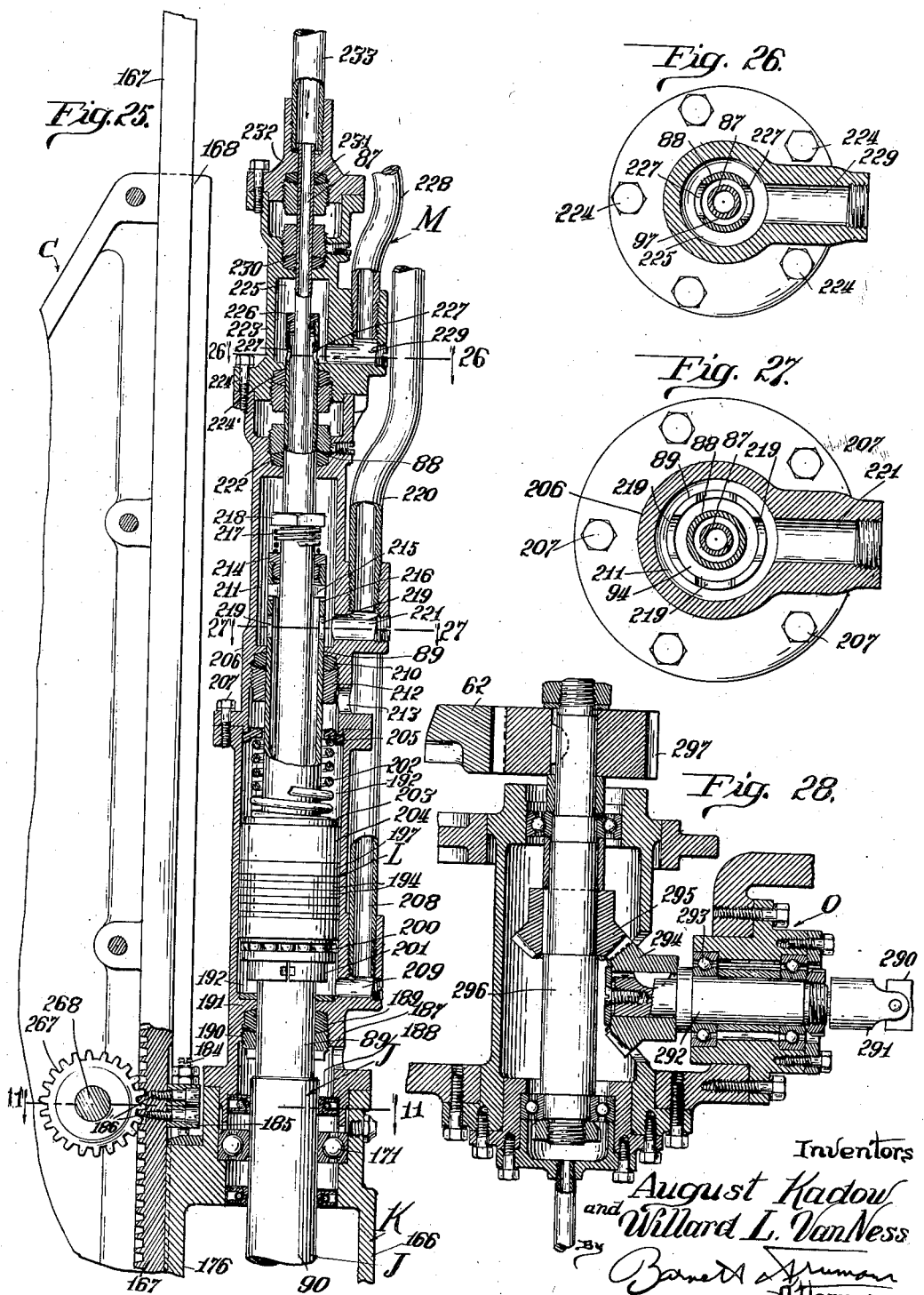

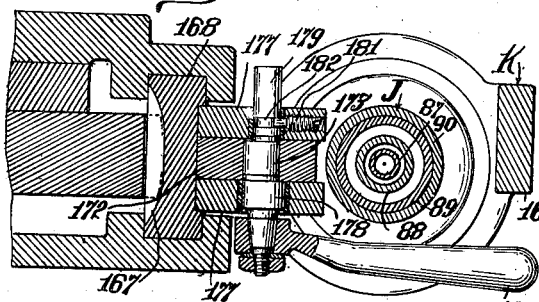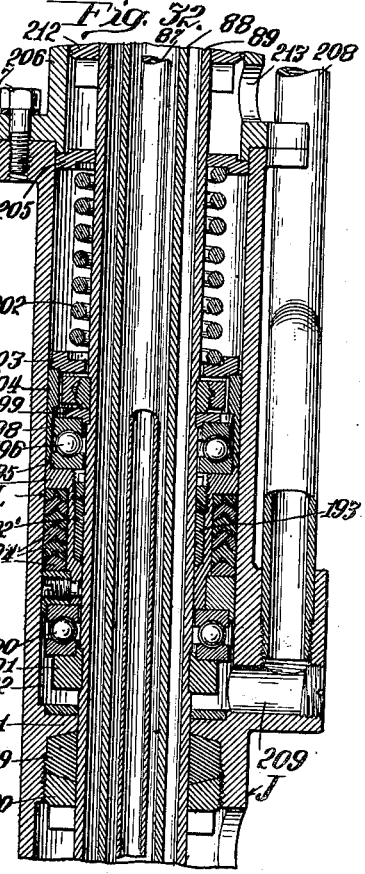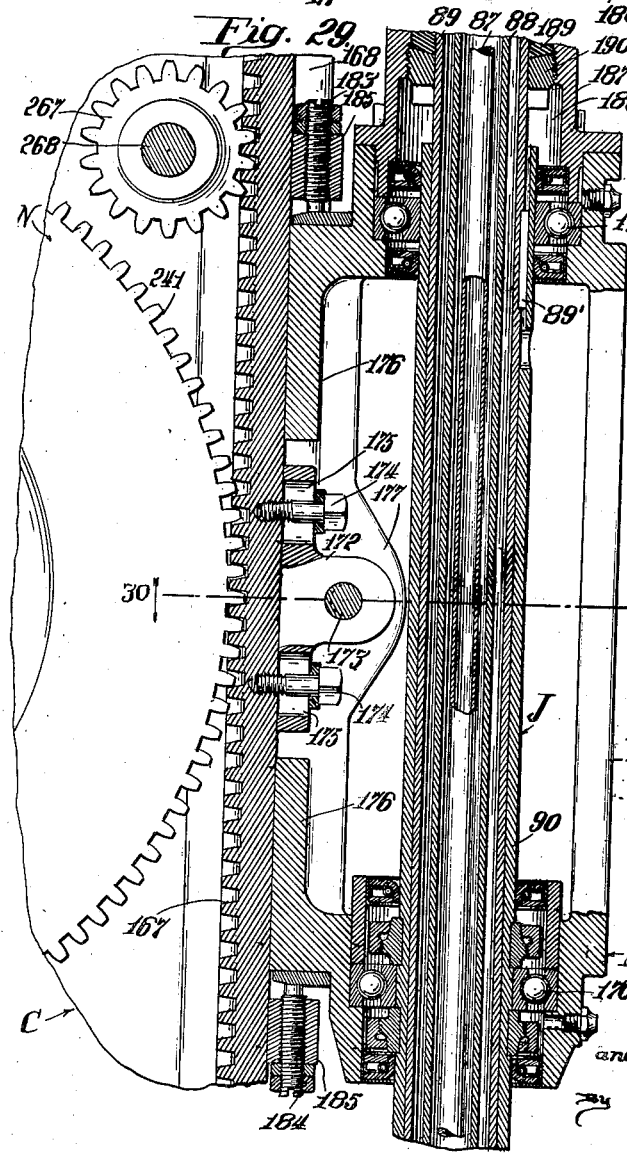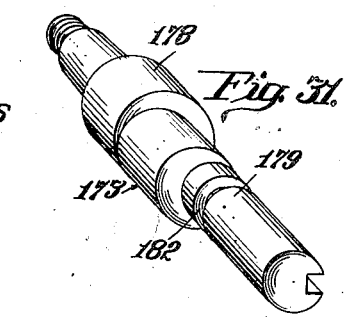

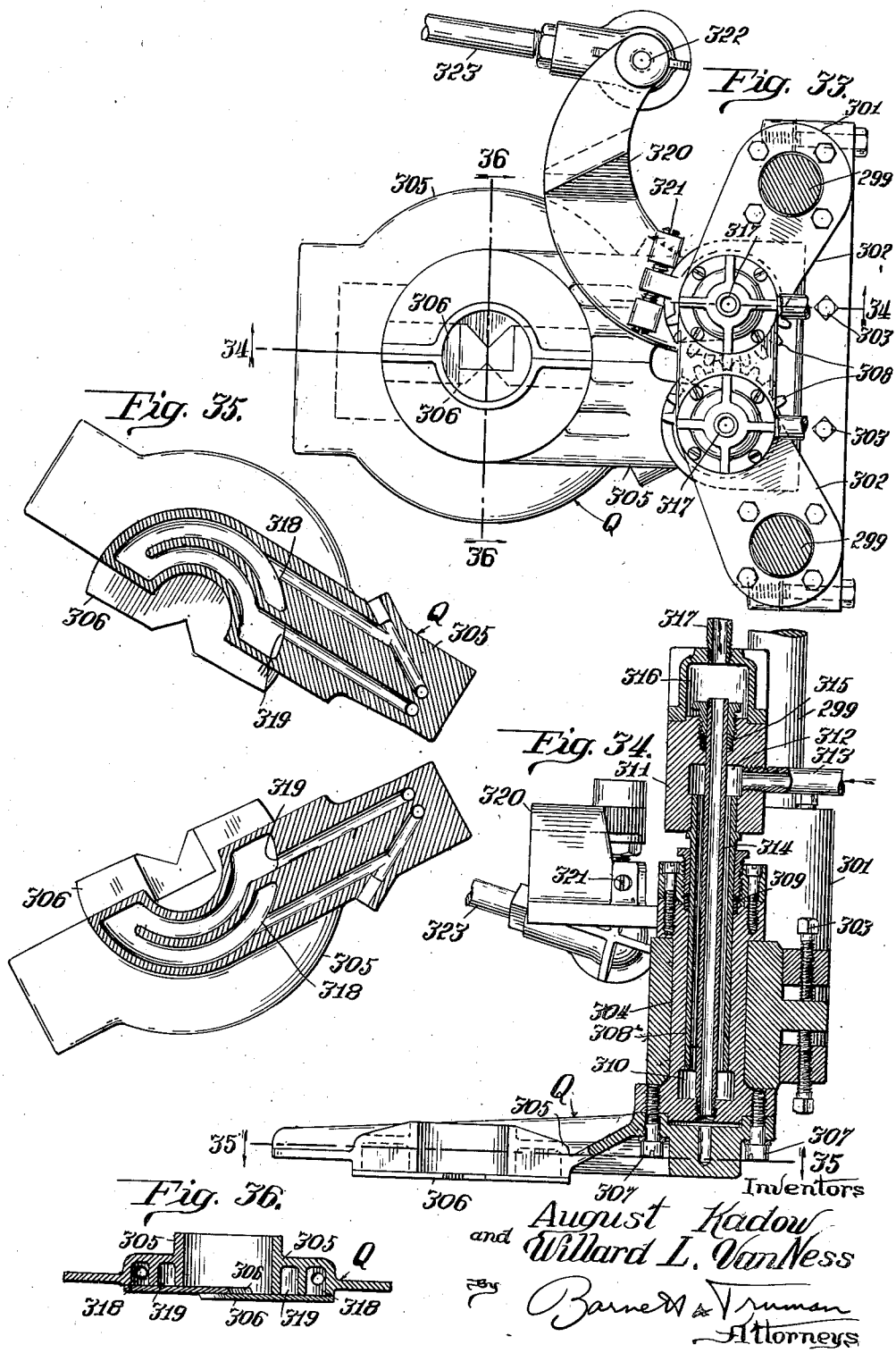

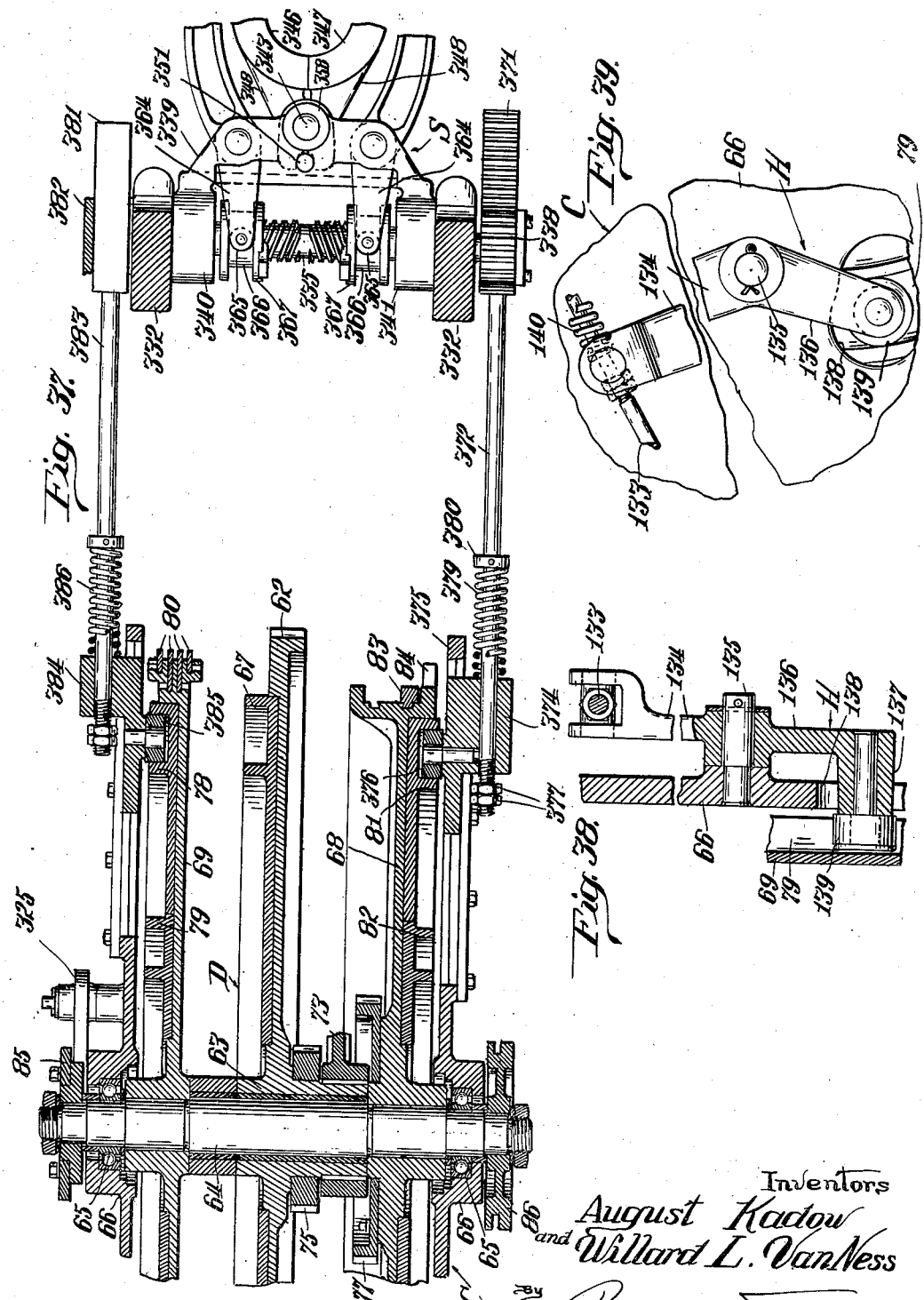

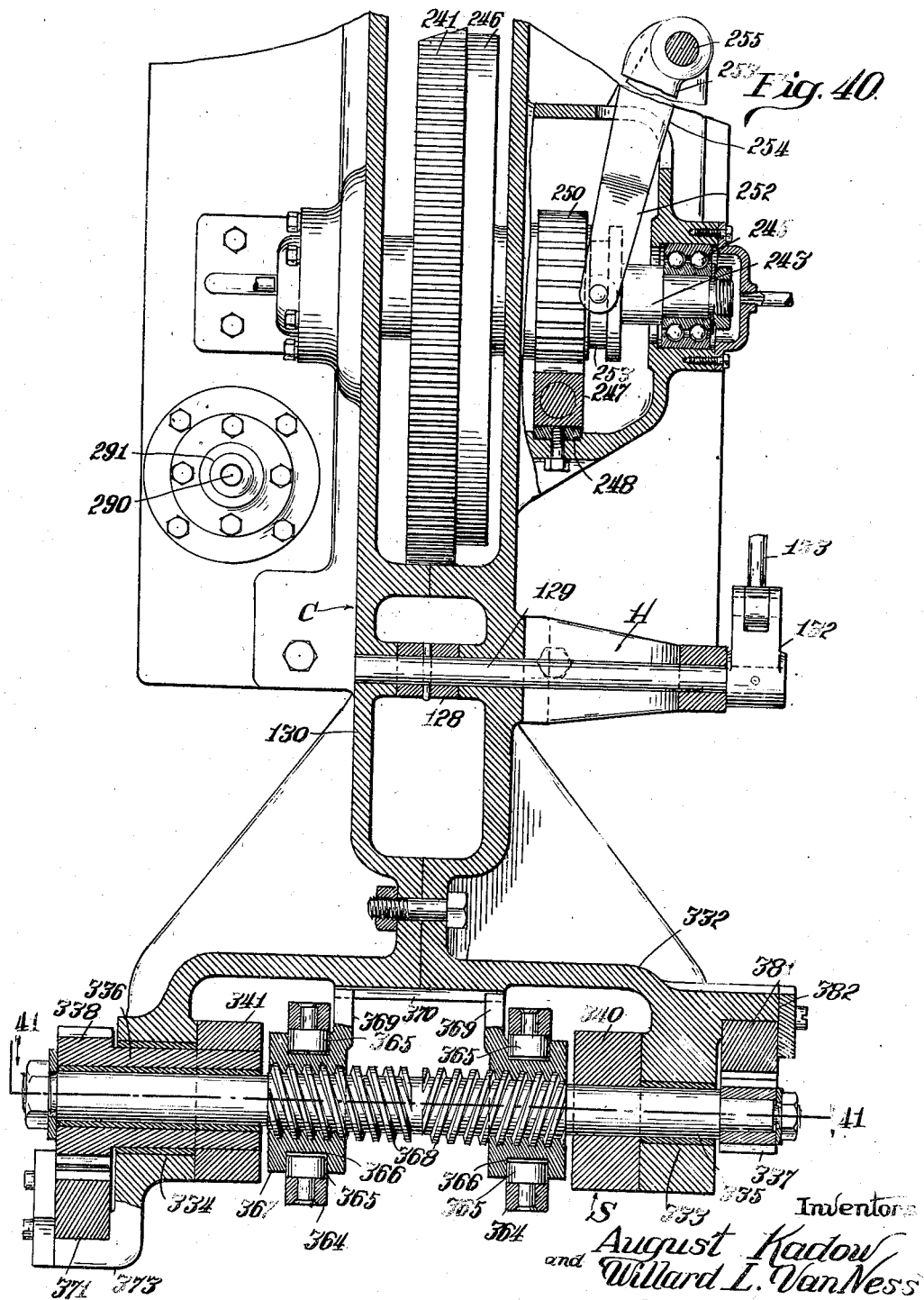

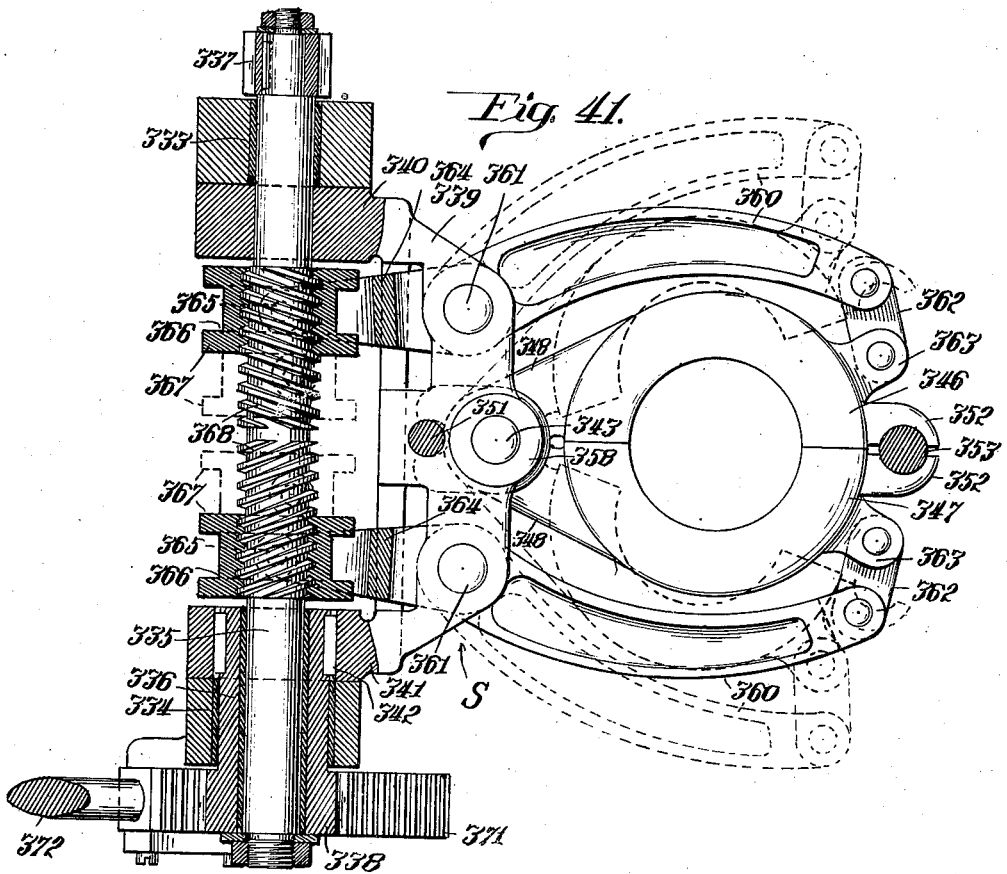
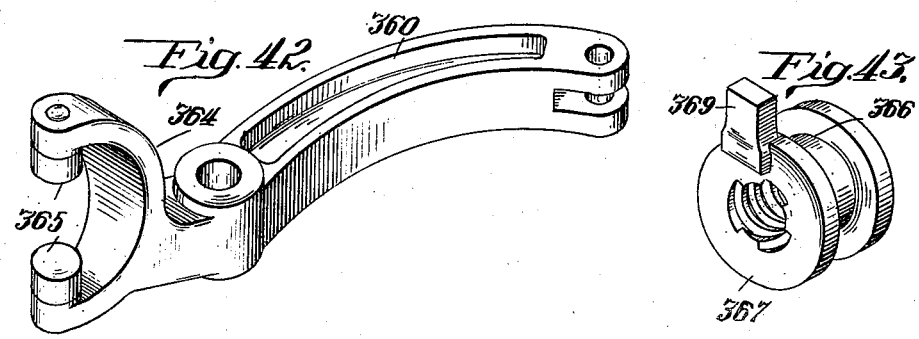
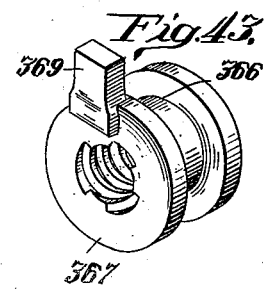

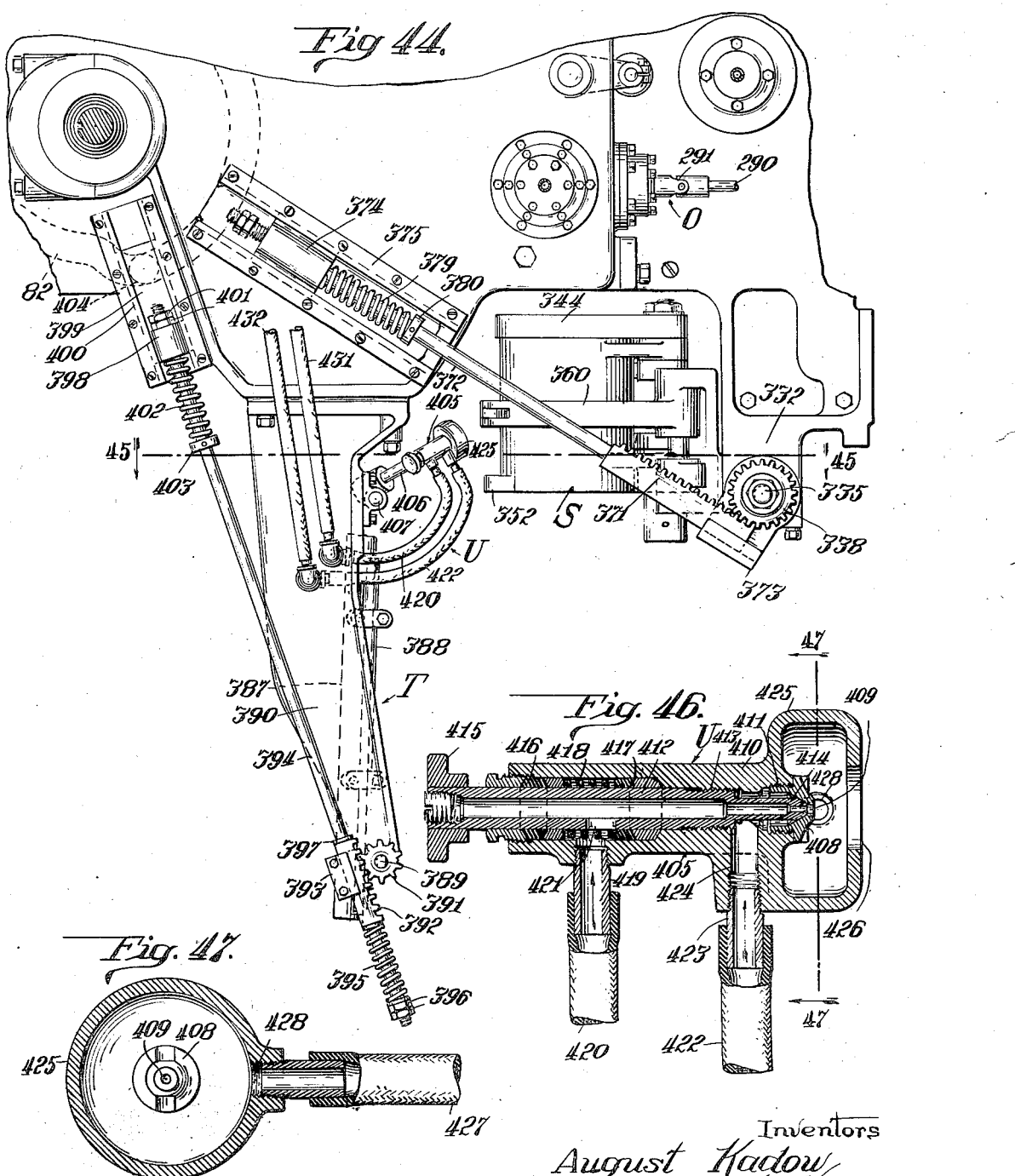

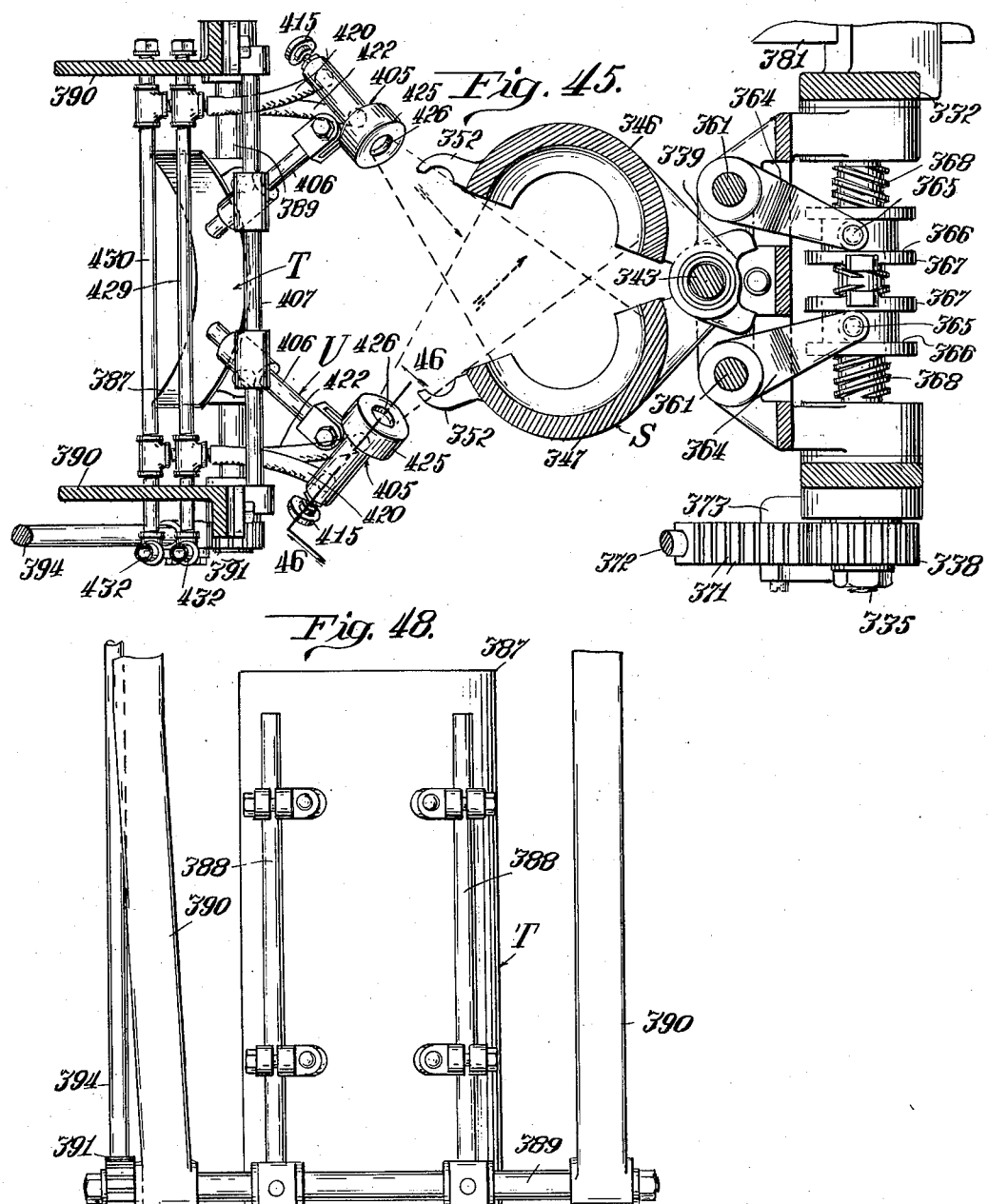

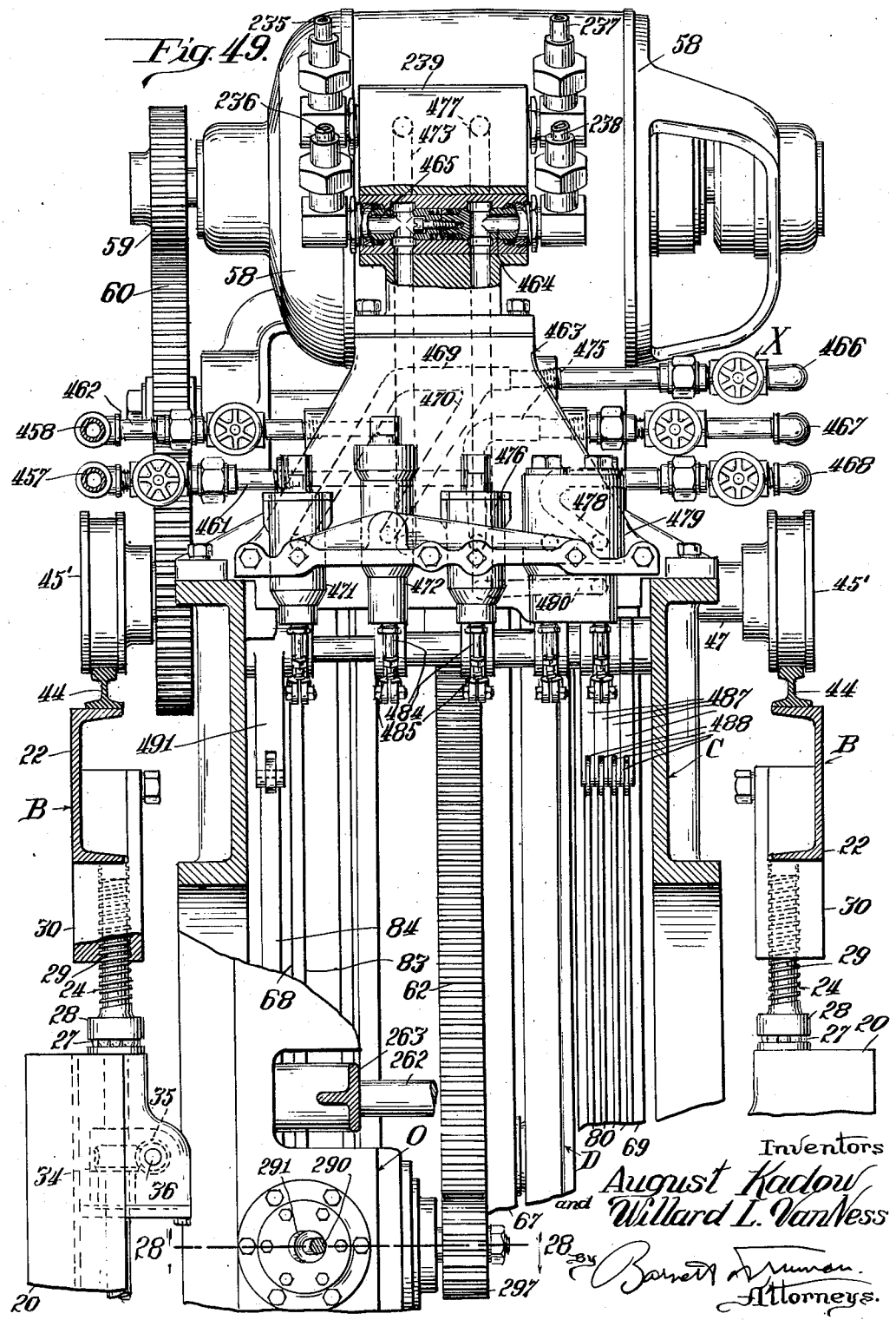

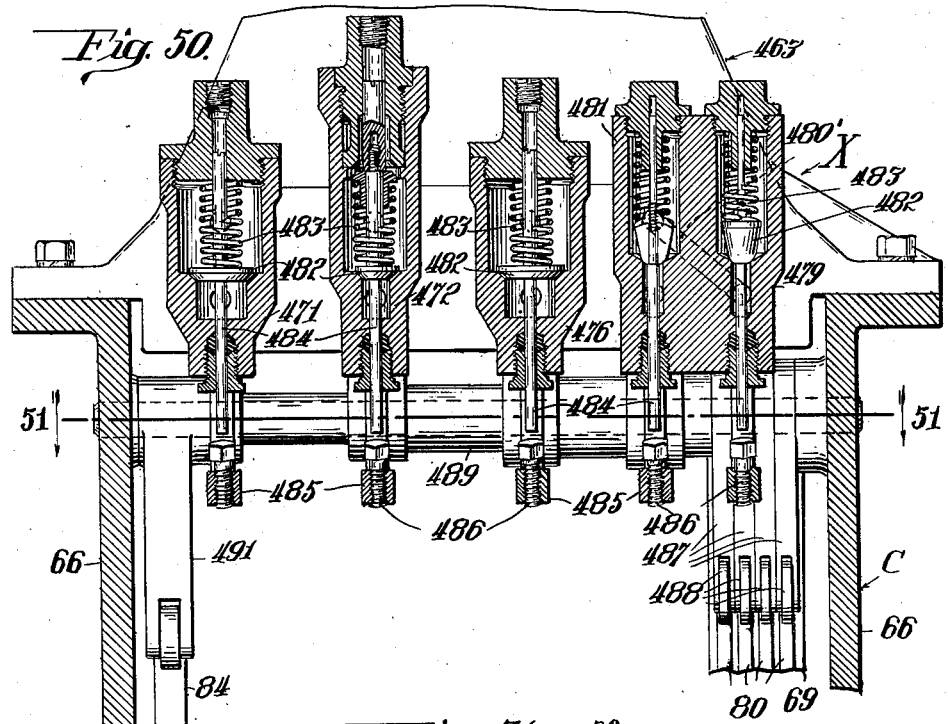
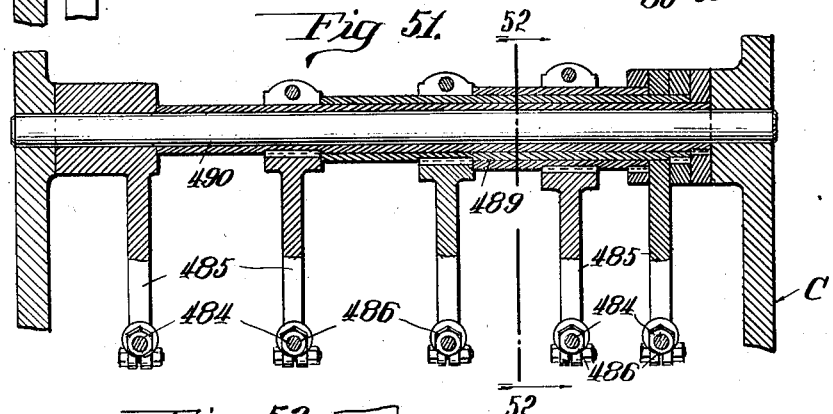
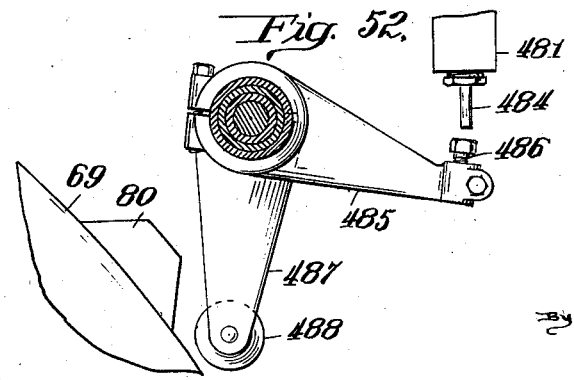

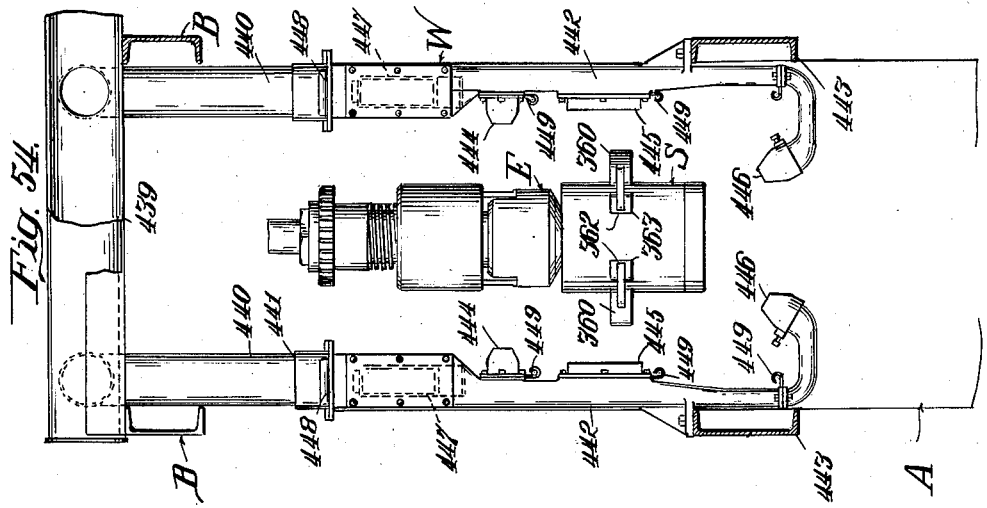

Nov. 5, 1935.    A. KADOW ET AL    2,020,032
GLASS WORKING APPARATUS
Filed July 3, 1933    21 Sheets-Sheet 21
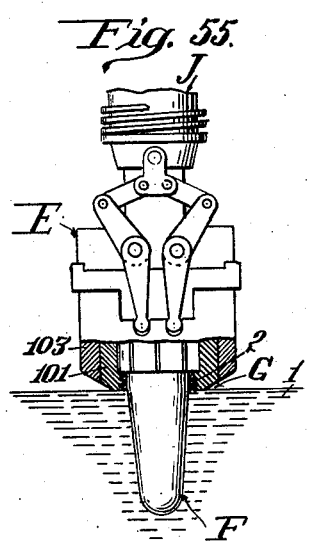
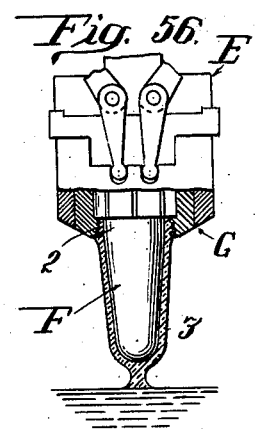
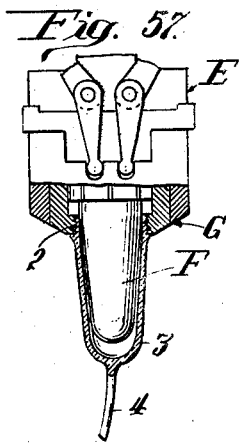
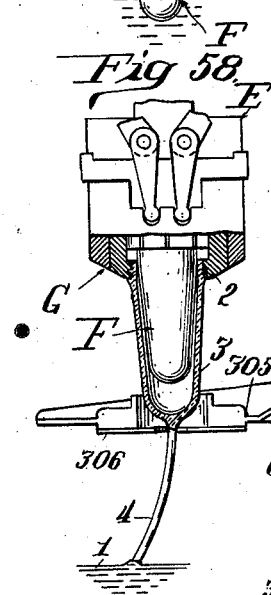
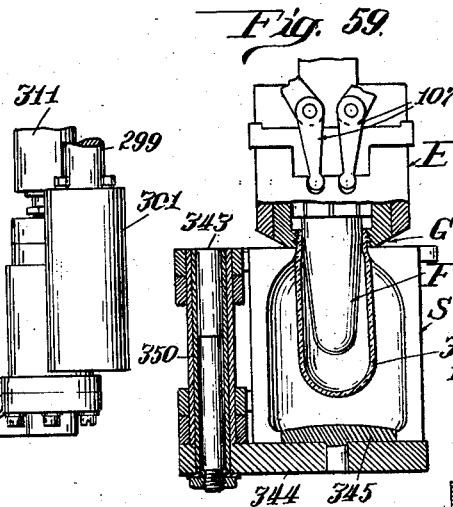
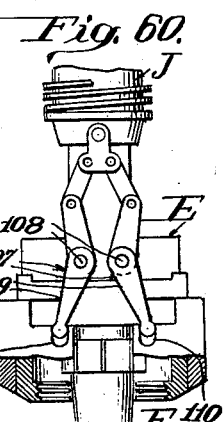
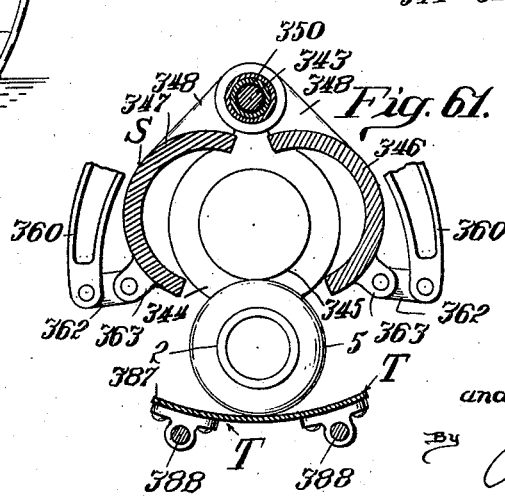
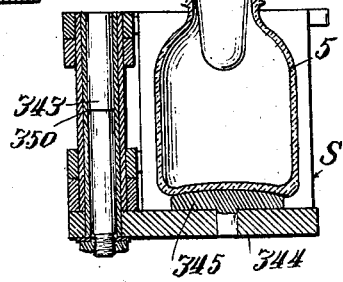
Inventors
August Kadow
and Willard L. VanNess
By Barnett Truman
Attorneys Patented Nov. 5, 1935

2,020,032

UNITED STATES PATENT OFFICE 2,020,032

GLASS WORKING APPARATUS

August Kadow and Willard L. Van Ness, Toledo, Ohio, assignors to The Libbey Glass Manufacturing Company, Toledo, Ohio, a corporation of Ohio Application July 3, 1933, Serial No. 678,877

56 Claims. (Cl. 49—5)

This invention relates to new and useful improvements in glass working apparatus, and more particularly to an apparatus for withdrawing initially hollow glass blanks from a pool of molten glass and subsequently expanding these blanks within a mold to give the desired form to the finished hollow glass articles. The improved method of forming glass articles, as best carried out by the apparatus herein disclosed and claimed, is disclosed and claimed in the copending application of August Kadow, Serial No. 678,878 filed of even date herewith.

Briefly described, this apparatus comprises a glass gathering and working head comprising a neck-mold and a plunger or form, said head being mounted at the lower end of a spindle and adapted to be projected downwardly through an opening in a furnace wall so as to partially immerse the plunger in a pool of molten glass. The relative temperatures of the plunger and glass are so controlled that a hollow glass blank of predetermined thickness is formed on the exterior surface of the submerged plunger, while at the same time a neck portion of the blank is drawn up by suction into the sectional neck-mold positioned above the upper end of the immersed form. After the plunger and glass blank have been withdrawn from the molten pool, the plunger is elevated relatively to the neck-mold to release the plunger from the blank, and the blank is partially expanded by internally applied air pressure. After being withdrawn from the furnace, the spindle with the suspended blank is rotated about its vertical axis and a sectional finishing or blow mold is brought into position about the blank, after which the blank is expanded within the mold by fluid pressure applied through the rotating spindle. When the article has been blown to form, the neck mold is opened to release the article from the working head, and the mold is swung away from the spindle and opened to release the article and discharge it onto a suitable take-out mechanism. The spindle and working head is then lowered again into the furnace to gather another blank and the operations are repeated.

The principal object of this invention is to provide an improved glass-working apparatus of the type briefly described hereinabove and disclosed more in detail in the specifications which follow.

Another object is to provide an improved apparatus for gathering initially hollow glass blanks.

Another object is to provide an improved form of supporting frame for adjustably supporting and positioning the apparatus with relation to the furnace.

Another object is to provide an improved carriage for glass-working apparatus and means for moving the same and locking it in position.

Another object is to provide an improved form of driving mechanism for the several moving units of the apparatus.

Another object is to provide an improved form of gathering head for drawing the glass blanks from the molten pool.

Another object is to provide an improved neck-mold and operating means therefor.

Another object is to provide an improved form of plunger or gathering form, and means for controlling the temperature of the form.

Another object is to provide improved means for elevating the plunger with relation to the neck-mold.

Another object is to provide an improved form of spindle and supporting carriage therefor.

Another object is to provide improved means for vertically reciprocating the spindle.

Another object is to provide an improved emergency elevating means for the spindle.

Another object is to provide improved means for rotating the spindle.

Another object is to provide an improved cut-off device for removing the trailing glass from the blank.

Another object is to provide an improved air-jet mechanism for disposing of the glass cut off from the blank.

Another object is to provide an improved form of blow-mold and operating mechanism therefor.

Another object is to provide an improved mold-spraying mechanism.

Another object is to provide an improved take-out mechanism for disposing of the finished glass articles.

Another object is to provide improved fluid-control valves and conduits for properly distributing the air under pressure, vacuum and cooling water and air to the various parts of the apparatus.

Other objects and advantages of this invention will be more apparent from the following detailed description of certain approved forms of apparatus designed and operating according to the principles of this invention.

In the accompanying drawings:

Fig. 2 is a partial plan view and partial horizontal section showing a portion of the furnace structure.

Fig. 3 is a detail vertical section through one of the gathering chambers, the section being taken substantially on the line 3—3 of Fig. 2.

Fig. 4 is a side elevation of the assembled machine, with parts broken away, the view corresponding to Fig. 1 but being on a larger scale and showing the spindle in elevated position and the blow mold closed about the blank.

Fig. 5 is a front elevation of the spindle-assembly and some associated parts, the view being taken from the right looking at Fig. 4.

Fig. 6 is partial vertical section, taken substantially on the line 6—6 of Fig. 4, showing a portion of the frame-elevating mechanism.

Fig. 7 is a plan view of the assembled machine and carriage.

Fig. 8 is a detail horizontal section, taken substantially on the line 8—8 of Fig. 18.

Fig. 9 is a detail vertical section showing the movable centering roller, the view being taken substantially on the line 9—9 of Fig. 8.

Fig. 10 is a horizontal section through the assembled apparatus, the view being taken substantially on the line 10—10 of Fig. 4.

Fig. 11 is a detail horizontal section, taken substantially on the line 11—11 of Fig. 25, showing the emergency elevating mechanism.

Fig. 12 is a detail elevation looking in the direction of the arrow x in Fig. 11.

Fig. 13 is a detail section taken substantially on the line 13—13 of Fig. 11.

Fig. 14 is a central vertical section through the gathering head and the lower portion of the spindle.

Fig. 15 is a horizontal section taken substantially on the line 15—15 of Fig. 14.

Fig. 16 is a view similar to the lower portion of Fig. 14 but showing the plunger elevated within the gathering head.

Fig. 17 is a horizontal section through the plunger, beneath the head of the plunger, the view being taken on the line 17—17 of Fig. 14.

Fig. 19 is a central vertical section through a modified form of plunger.

Fig. 20 is a partial bottom view of the structure shown in Fig. 19.

Fig. 21 is a central vertical section showing a further modification of the lower portion of the structure shown in Fig. 19.

Fig. 22 is a partial bottom view of the structure shown in Fig. 21.

Fig. 23 is a partial vertical section, taken substantially on the line 23—23 of Fig. 18, showing a portion of the spindle rotating mechanism, and the fixed centering rollers for the spindle and gathering head.

Fig. 24 is a vertical section through the lower portion of the spindle rotating mechanism, the view being taken substantially on the line 24—24 of Figs. 10 and 23.

Fig. 25 is a vertical section through the upper portion of the spindle assembly and fluid supply connections thereto, the view being taken substantially on the line 25—25 of Fig. 5.

Fig. 26 is a horizontal section taken substantially on the line 26—26 of Fig. 25.

Fig. 27 is a horizontal section taken substantially on the line 27—27 of Fig. 25.

Fig. 28 is a horizontal section through the upper portion of the spindle-rotating mechanism, the view being taken substantially on the line 28—28 of Fig. 49.

Fig. 29 is a longitudinal central section through the spindle supporting mechanism, the view being taken in the same plane as Figs. 18 and 25.

Fig. 30 is a horizontal section showing the spindle carriage locking mechanism, the view being taken on the line 30—30 of Fig. 29.

Fig. 31 is a perspective view of the eccentric locking bolt shown in Fig. 30.

Fig. 32 is a longitudinal central section through the pressure cylinder for elevating the plunger, the view being taken substantially on the line 32—32 of Fig. 5.

Fig. 33 is a plan view and partial horizontal section of the cut-off mechanism, the view being taken substantially on the line 33—33 of Fig. 4.

Fig. 34 is a vertical section taken substantially on the line 34—34 of Fig. 33.

Fig. 35 is a horizontal section taken substantially on the line 35—35 of Fig. 34, but showing the cutting knives in opened or separated positions.

Fig. 36 is a vertical section taken substantially on the line 36—36 of Fig. 33.

Fig. 37 is a sectional view, taken substantially on the line 37—37 of Fig. 4, showing a portion of the blow-mold operating mechanism.

Fig. 38 is a partial vertical section taken substantially on the line 38—38 of Fig. 10, showing the upper portion of the neck-mold opening mechanism.

Fig. 39 is a detail elevation looking from the right of Fig. 38.

Fig. 40 is a vertical section taken substantially on the line 40—40 of Fig. 4.

Fig. 41 is a partial horizontal section, taken substantially on the line 41—41 of Fig. 40, showing the blow-mold assembly.

Fig. 42 is a perspective view of one of the mold-section operating levers.

Fig. 43 is a perspective view of one of the nuts or travelers shown in Fig. 41.

Fig. 44 is a partial side elevation showing the take-out mechanism, the blow-mold in retracted and opened position, and the mold cooling mechanism.

Fig. 45 is a horizontal section, taken substantially on the line 45—45 of Fig. 44.

Fig. 46 is a longitudinal central section through one of the mold spraying devices, the view being taken substantially on the line 46—46 of Fig. 45.

Fig. 47 is a detail section taken substantially on the line 47—47 of Fig. 46.

Fig. 48 is an elevation of the take-out mechanism in raised position, the view being taken looking from the right at the lower portion of Fig. 44.

Fig. 49 is an enlarged vertical section showing a portion of the fluid-distributing mechanism, the view being taken substantially on the line 49—49 of Fig. 7.

Fig. 50 is a vertical section through the valve assembly, the view being taken substantially on the line 50—50 of Fig. 7.

Fig. 51 is a horizontal section taken substantially on the line 51—51 of Fig. 50.

Fig. 52 is a detail vertical section showing one of the valve operating bellcranks, the view being taken substantially on the line 52—52 of Fig. 51.

Fig. 53 is a side elevation of the device for applying cooling air to the glass-working head and blow-mold.

Fig. 54 is a front elevation looking from the right at Fig. 53.

Figure 1:
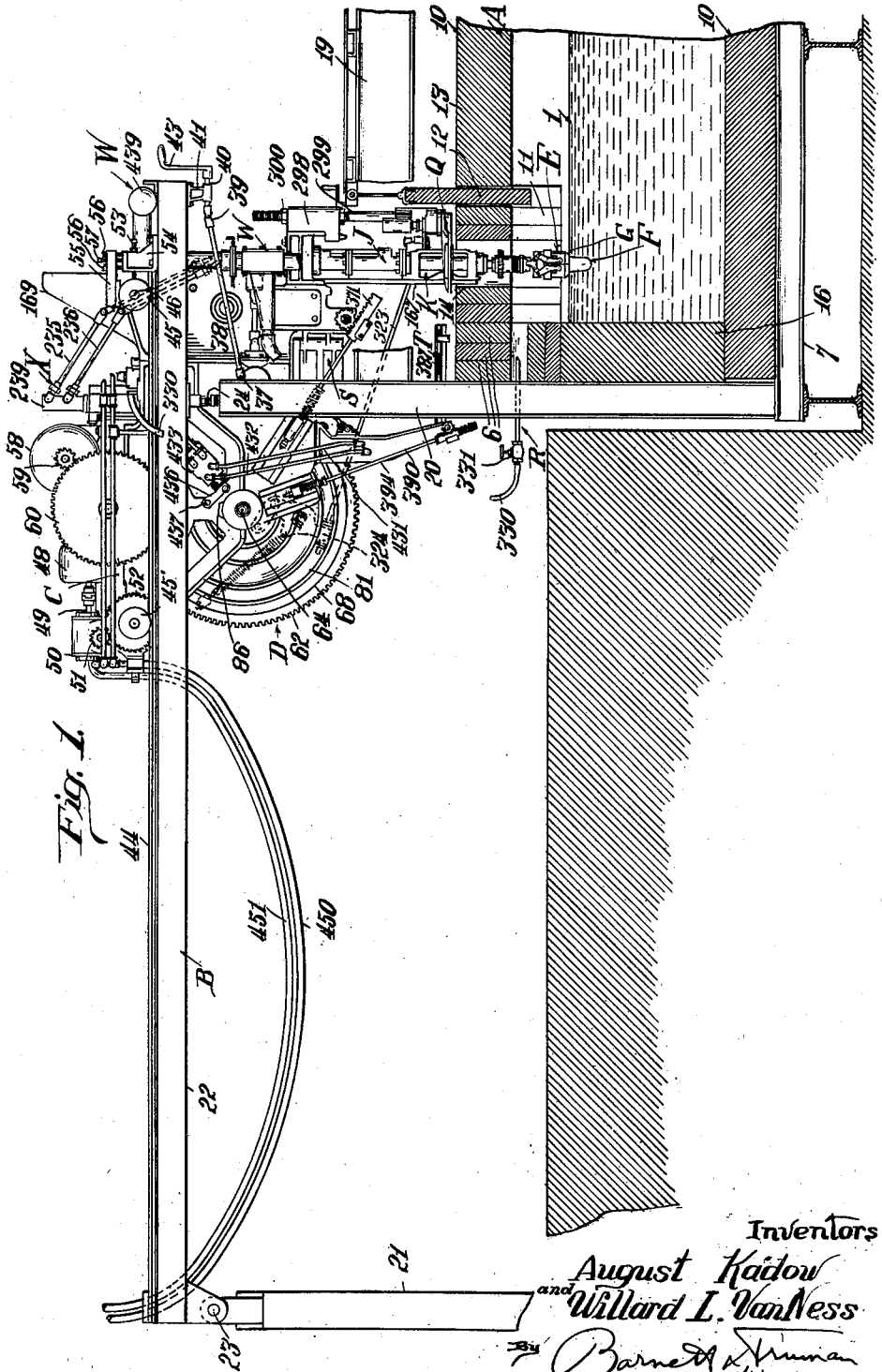
Fig. 1 is a side elevation, with some parts broken away, of the assembled apparatus showing the gathering head lowered into the furnace to draw a charge of glass.

Figs. 55 to 61 inclusive are a series of diagrammatic views illustrating the glass-working operations.

Generally described, the apparatus comprises a furnace structure A which incloses and maintains a pool of molten glass from which the glass blanks are drawn, a fixed but adjustable supporting frame B positioned adjacent the furnace, and a carriage C movably positioned on frame B for supporting the operating machine parts. The machine comprises a main driving assembly D mounted in carriage C for actuating the several movable parts of the mechanism in properly timed relation. The blank-forming mechanism comprises a gathering head E which is movable into and out of the furnace, this head in turn comprising a gathering form or plunger F which is immersed in the molten pool and about which the blank is formed and a neck mold or neck ring G in which the upper portion of the blank is formed. The neck-mold is opened and closed by means of a mechanism indicated generally at H. The gathering head is carried at the lower end of a spindle assembly comprising a rotatable spindle J, a spindle supporting mechanism K, a plunger elevating mechanism L, and connections indicated generally at M for conducting fluids to and from the rotatable spindle. Mechanism N is provided for reciprocating the spindle vertically, and mechanism O for rotating the spindle at certain times. An emergency elevating means P is provided for withdrawing the spindle and gathering head from the furnace in the event that the mechanism N should fail to function properly at any time. A cut-off device indicated generally at Q is adapted to sever the trailing glass from the blank when the gathering head is withdrawn from the furnace, and a cooperating air jet R is provided to blow the trailing glass back into the pool. The blow-mold or finishing mold and its operating mechanism is indicated generally at S, and T indicates a take-out mechanism for disposing of the finished glass-ware when released from the mold. A spraying mechanism U is used to moisten and cool the mold sections when swung to inoperative position. A mechanism W is provided for directing cooling air against certain of the working parts which are subjected to high working temperatures, and also to regulate the temperature of the glass blank, and at X is indicated generally the assembled valves and conduits for establishing the fluid-control connections with the several working parts, that is for controlling the air under pressure, vacuum and cooling water.

All of these mechanisms will be described more in detail hereinafter, but a brief description of the glass-working operations will first be given referring more particularly to the diagrammatic illustrations in Figs. 55 to 61 inclusive. The glass-working head E is first lowered to substantially the position shown in Fig. 55 so that the form or plunger F will be projected downwardly and immersed into the pool 1 of molten glass, and the lower edge of the neck ring G will be brought adjacent the surface of the glass pool so that molten glass may be sucked into this neck mold to form the neck portion 2 of the glass blank. Internal passages are provided in the working head establishing vacuum connections to the neck mold for drawing glass up into this mold, as well as passages for circulating cooling water through the interior of the form F so that its temperature may be properly regulated relative to the temperature of the molten glass. A hollow glass blank 3 of predetermined wall thickness will be formed about the plunger F, and as the working head is withdrawn from the pool, this blank will be lifted out with the plunger as indicated in Fig. 56. The thickness of the glass blank as controlled by regulating the relative temperatures of the form F and the molten glass and the length of time the cooled plunger remains in the molten pool and the speed with which it is withdrawn therefrom, and as will be hereinafter described means may be provided for exerting suction at different locations on the exterior of form F to assist in this glass gathering operation. Soon after the plunger and blank have been withdrawn from the pool of molten glass, the plunger F is elevated in the working head E, relative to the neck-mold G which supports the blank 3, so as to separate the plunger from the blank as shown in Fig. 57, and a puff of air is admitted into the blank to slightly expand it. When the blank has been raised to a suitable height, as shown in Fig. 58, the cut-off mechanism Q consisting of a pair of cooperating knives or shears operates to sever the trailing glass 4 directly beneath the bottom of the blank, this trailing glass being thrown back into the pool to one side of the draw-pot by the action of the cutting knives and by the air-jet device R as will be hereinafter described. When the working head has been completely elevated to the position shown in Fig. 4, connections will be established for rotating the head and the blank 3 carried thereby, and the finished mold S will be moved into position about the blank as shown in Fig. 59. The still molten blank will then be expanded by internal air pressure supplied through the spindle and gathering head to form the finished hollow glass article 5 as indicated in Fig. 60. When the blowing operation has been completed, the neck-mold sections will be opened or separated so as to release the neck 2 of the article and the spindle and head E will be raised a short distance to free the plunger F from the neck portion 2 of the glass article 5 (all as shown in Fig. 60), after which the mold S is swung downwardly and toward the left from the position shown in Fig. 60, at the same time the two sections of the mold being separated to release the glass article 5. When the mold has reached substantially the horizontal position shown in Fig. 61, the glass article 5 will be dropped out onto a suitable take-out mechanism T, all as will be more apparent from the detailed description of these parts which will follow. The mold S is then swung to a substantially inverted position so that it will be entirely out of the way of the spindle mechanism, at which time means is applied for cooling the mold sections. This cooling operation takes place while the working head E is again being lowered to gather a new blank of glass, after which the cycle of operations hereinabove described is repeated.

*The furnace and draw-tank (Figs. 1, 2 and 3)*

The furnace indicated generally at A for supplying the molten glass may be built up as usual of refractory blocks 6 supported and held together by a metallic skeleton indicated generally at 7. The furnace assembly comprises a melting tank 8 in which the molten glass is formed, the glass flowing through the neck 9 into the draw-tank 10. Suitable burners may be provided, as is usual in this glass working art, to maintain the molten glass in tank 10 at the proper temperature. A plurality of the glass working machines hereinafter described may be positioned in rows along the sides of the tank 10. In the example shown in Fig. 2, three of the machines are positioned along the near side of the tank, and it will be understood that a similar group of machines could be positioned along the far side of the tank. Separate portions of the glass pool may be partially isolated to form separate draw-pots for the different machines by means of suspended partitions 11 which project downwardly adjacent to or into the pool 1, and a vertically adjustable curtain block 12 is provided to form the rear wall of this draw-pot or enclosure. The top of tank 10 is completely enclosed by the roof 13 except for the several draw openings 14 (one for each machine) through which the working head and spindle are projected downwardly to the gathering position shown in Fig. 1. The roof wall is cut away, outwardly and downwardly at one side of the opening 14, as shown at 15 in Fig. 3 and in dotted lines in Fig. 2. A horizontal passage 17 is provided in the front wall 16 of the tank, in which projects the spout 18 of the air-jet device R. This device is adapted, at the proper time, to project a blast of air against the trailing glass 4 (see Fig. 58) when cut off by the mechanism Q, and blow this trailing glass back into the pool to a position at one side of the draw-pot assisted by the throwing action of the cutting knives (Fig. 3), the cut-away portion 15 of the draw opening 14 being provided to give clearance for this falling glass. This trailing glass 4 has been partially chilled by the preceding gathering process and it would be undesirable to have it fall directly back into the pool so as to form a portion of the succeeding gather or blank. By blowing it to one side of the pool, time is provided for this glass to be re-melted to the proper temperature before it again flows into drawing position.

If desired, a drawing ring may be floated in the pool 1 to segregate a smaller pool of glass into which the gathering form is dipped, as is well known in this art.

A suitable cat-walk 19 may be supported above the draw tank to permit access to the adjacent portions of the machine when in working position.

*The supporting frame (Figs. 1, 2, 4, 5, 6, 7, 49, 53 and 54)*

The supporting frame B comprises a pair of suitably spaced apart uprights 20 (here shown as I-beams) positioned adjacent the side wall 16 of the draw tank, and a pair of similarly spaced uprights 21 positioned in the respective vertical planes of the upright 20 but at a location considerably remote from the draw-tank. The horizontal beams 22, which may be connected together at suitable intervals, are pivotally mounted at their outer ends to the tops of uprights 21 as indicated at 23. Mechanism is provided for adjustably supporting the inner end portions of beams 22 from the uprights 20. A vertical shaft 24 is rotatably mounted in bearings formed in brackets 25 and 26 secured to the upper end portions of each of the uprights 20. A roller thrust bearing 27 is provided between the upper end of bracket 25 and a collar 28 formed on shaft 24. The upper end of shaft 24 is threaded as indicated at 29 and engaged within the internal threads of a block 30 secured to the adjacent horizontal beam 22. Bevel pinions 31 secured to the lower ends of the two shafts 24 mesh with bevel pinions 32 secured on the opposite ends of a transverse shaft 33 journaled in the brackets 26 so that rotation of one shaft 24 will cause rotation of the other shaft. A worm wheel 34 secured on one of the shafts 24 (see Fig. 6) meshes with a worm 35 on a shaft 36 journaled in the bracket 25, this shaft being connected through universal joint 37, shaft 38 and universal joint 39 with an operating shaft 40 journaled in a bracket 41 mounted on the lower side of the adjacent horizontal beam 22. The non-circular outer end portion 42 of this shaft 40 is adapted to be engaged by the socketed crank 43. By rotating this crank 43, the two screws 29 are simultaneously rotated so as to simultaneously raise or lower the inner end portions of the supporting beams 22. This enables the glass working machine which is supported by beams 22 to be adjusted vertically so that the glass-working head E, when lowered as shown in Fig. 1, will be properly positioned relative to the surface of the glass pool 1. This permits the machine to be adjusted to compensate for changes in the level of the glass pool.

Rails 44 are positioned on the respective horizontal beams 22 to movably support the wheels or rollers 45 of carriage C.

*The carriage (Figs. 1, 4, 5, 7 and 49)*

The carriage C comprises a plurality of rigidly connected frame members in which the working parts of the machine are supported. Several of these frame members will be specifically referred to hereinafter in connection with the working parts which they support. Stub-shafts 46 mounted in the forward end portions of the carriage carry the front rollers 45 which travel on the rails 44. The transverse shaft 47 journaled in the rear portion of the carriage has the rollers 45' secured on its outer end portion, these rollers also traveling on the rails 44. In order to move the carriage and the apparatus supported thereby horizontally along the rails 44, a small motor 48 is positioned on the carriage and connected through shaft 49, reduction gearing 50 and pinion 51 with a gear 52 secured on the transverse shaft or axle 47. By means of this motor drive the carriage C and the entire machine supported thereby may be run back along the rails 44 from the working position shown in Fig. 1 to a position remote from the draw-tank when replacements or major adjustments are required.

Means are provided for locking the carriage when in working position. An adjustable set screw 53 is mounted in a casting or bracket 54 supported on one of the beams 22. This screw 53 is adapted to engage the forward surface of the adjacent wheel or roller 45 so as to limit the movement of the carriage toward the draw-tank. A clamping block 55 which engages the top of roller 45 and holds it down against the rail 44 is adjustably secured to the supporting bracket 54 by a pair of clamping screws 56 and an intermediate spacing screw 57. When the carriage is to be run back away from the furnace, the screws 53 are loosened so as to release the wheel 45.

*The main driving mechanism (Figs. 1, 4, 7, 10, 37 and 49)*

The main driving mechanism D comprises a driving motor 58 rotating the small gear 59 which meshes with large gear 60 at one end of a counter shaft which carries at the other end small gear 61 meshing with the main, large central driving gear 62. This gear 62 has its hub portion 63 freely journaled on the central portion of the main central shaft 64 which is supported by anti-friction bearings 65 in the carriage side frames 66. The face-cam 67 which actuates the spindle raising and lowering mechanism N is formed on or secured to one side of the central driving gear 62. A pair of large cam disks 68 and 69 are keyed at 70 and 71 respectively to shaft 64 adjacent the inner sides of the respective carriage side frames 66. A stub shaft 72 journaled in a fixed frame member 73 intermediate gear 62 and cam disks 68 carries at one end a relatively large gear 74 meshing with a gear 75 keyed on the hub 63 of gear 62, the shaft 72 carrying at its other end a relatively small gear 76 which meshes with the gear 77 secured to the inner face of cam disk 68. The ratio of the reduction gearing 75, 74, 76 and 77 is such that the cam disks 68 and 69 and shaft 64 will be rotated at one-third the speed of the driving gear 62, that is, there will be three rotations of the driving gear 62 to one rotation of the cam disks.

On the outer side of cam disk 69 are positioned the face cams 78 and 79 which respectively operate the blow-mold opening and closing mechanism and the neck-mold opening and closing mechanism H. On the periphery of this cam disk is mounted the series of cams 80 which respectively operate the several valves for controlling the flow of pressure air, and vacuum to the glass working head. (See also Figs. 50 and 52.)

On the outer face of cam disk 68 are positioned the face cams 81 and 82 which respectively operate the blow-mold swinging mechanism and the take-out device T. On the periphery of cam disk 68 is mounted the drum-cam 83 which operates the clutch which controls the timing of the spindle raising and lowering mechanism N. A cam 84 is also mounted on the periphery of disk 68 for operating the valve which controls the flow of pressure air to the cut-off air jet R.

A cam 85 is mounted on one end of shaft 64 for operating the cut-off mechanism Q. A cam 86 mounted on the other end of shaft 64 operates the valve mechanism which controls the flow of water and air under pressure to the mold-cooling sprayers U.

All of the working parts of the apparatus which move during the normal operation of the machine are actuated or controlled by this group of cams carried by the main gear 62, cam disks 68 and 69 and shaft 64.

*The glass working head (Figs. 1, 4, 8, 9, 10, 14 to 23, 38, 39, 40 and 55 to 60)*

The glass working head indicated as a whole at E is carried at the lower end of the rotatable spindle J. The lower portion of the spindle comprises a plurality of nested tubes 87, 88, 89 and 90. The outermost tube 90 is the supporting shell which suspends the head E and neck-mold G, the shell 90 being rotatably supported in the spindle carriage K as hereinafter described. The inner group of tubes 87, 88 and 89 are slidable vertically within the outer tube or shell 90 (by the fluid-pressure means L hereinafter described) so as to elevate the plunger or form F with relation to the neck-mold G and detach the plunger from contact with the interior of the glass blank 3. The tube 89 has a slidable fit directly within the outer shell 90 but is keyed to shell 90 at 89' (see Fig. 29) to cause the tubes to rotate in unison. Tube 89 is threaded at its lower end at 91 into the head 92 of the plunger F. The next inner tube 88 is spaced from tube 89 by the spider 93 so as to provide an intermediate annular passage 94 serving as a conduit for the pressure air and vacuum which are supplied to the neck-mold G and the blank-forming element F. The lower end of tube 89 is secured in head 92 by the tapered pipe threads 95. The innermost tube 87 is spaced from tube 88 by spider 96 so as to provide an intermediate passage 97, the cooling water for the form F flowing down through tube 87 into the form and then flowing out through the annular passage 97. The form F is hollow so as to provide an interior chamber 98 into which the cooling water flows through the downwardly projecting end portion 99 of inner tube 87 provided with the adjustable extension sleeve 100 screwed onto the lower end portion of the tube. The water in chamber 98 is displaced upwardly by the incoming water and is forced upwardly and out of the spindle through annular passage 97. It is essential that the metallic form F (which has an exterior conformation designed in accordance with the desired interior form and the size of the glass blank 3) be maintained at such a temperature relative to the temperature of the molten glass that the glass will not be unduly chilled, but at the same time will not permanently adhere to the outer surface of the form. These temperature conditions are arrived at by designing the form F of a suitable heat conducting metal and giving the form a suitable wall thickness, and the temperature maintained in different portions of the form may be varied somewhat by adjusting the position of the extension sleeve 100 on the water inlet tube 97. The temperature of the glass blank is also regulated by adjusting the time that the plunger F remains in direct contact with the interior of the blank before being raised to the position shown in Fig. 16 where it is out of contact with the blank.

The neck-mold or neck ring G comprises a pair of similar half sections 101 which are adapted to be moved horizontally toward and from one another, and when closed together about the head 92 of form F the lower portions of the neck ring inclose the annular recess 2 about the upper portion of form F into which the neck portion of the blank is drawn. This recess 2 is so formed as to give the desired finished form to the neck of the glass article, as here shown a spiral thread 102 being formed in the wall of the neck ring so as to cast a similar thread on the glass article. Each half section 101 of the neck mold is mounted in a cage or housing 103 which is secured to and suspended from T-shape slides 104 mounted in similar shaped slideways 105 formed in the lower surface of the supporting block 106 fixedly mounted on the outer sleeve 90 of the spindle. A pair of similar levers 107 are each intermediately pivoted on the cylindrical outer portions of screw-bolts 108 mounted in the supporting block 106 and shell 90, the lower arm 109 of each lever engaging in a slot 110 in one of the slidable housings 103. The upper arms 111 of the two levers are connected by links 112 with a central clevis 113 thus forming a toggle. It will now be apparent that if the clevis 113 is forced downwardly, this toggle will serve to spread the upper arms 111 of the two levers and force the lower arms 109 together so as to firmly hold the neck mold in closed position about the gathering form F. On the other hand, if the clevis 113 is drawn upwardly, the lower arms 109 of the two levers will be spread so as to slide the housings 103 and the neck ring sections 101 carried thereby away from one another (see Fig. 60), thus opening the neck mold and releasing the formed neck portion of the glass article.

The two clevises 113 at the opposite sides of the spindle are connected by bolts 114 with the lower collar portion 115 of the sleeve 116. This collar portion 115 slides on the outer surface of tube 90, and the inner end portions 117 of the bolts 114 project into vertical slots 118 formed in tube 90 so as to limit the vertical movements of the sleeve and also to prevent relative rotation between the sleeve and tube. The main upper portion of sleeve 116 is spaced outwardly from the tube 90 and slides at its upper end over an annular collar 119 secured by screw-bolts 120 to tube 90, an expansion spring 121 being housed between the sleeve and tube and abutting at its upper and lower ends against the collars 119 and 115 so as to normally force the sleeve 116 downwardly, and through the clevises 113 and the toggle and lever connections holding the neck ring G in closed position.

A gear 122 (by means of which the spindle and working head are rotated, as will be hereinafter described), is slidably keyed at 123 on the sleeve 116 and is normally held up against a stop collar 124 secured on sleeve 116 by an expansion spring 125 which surrounds sleeve 116 and bears at its opposite ends against the sleeve portion 126 of the gear and a collar 127 projecting outwardly from the lower portion of the sleeve 114. The function of spring 125 will be described later in connection with the spindle-rotating mechanism O.

Figure 18:
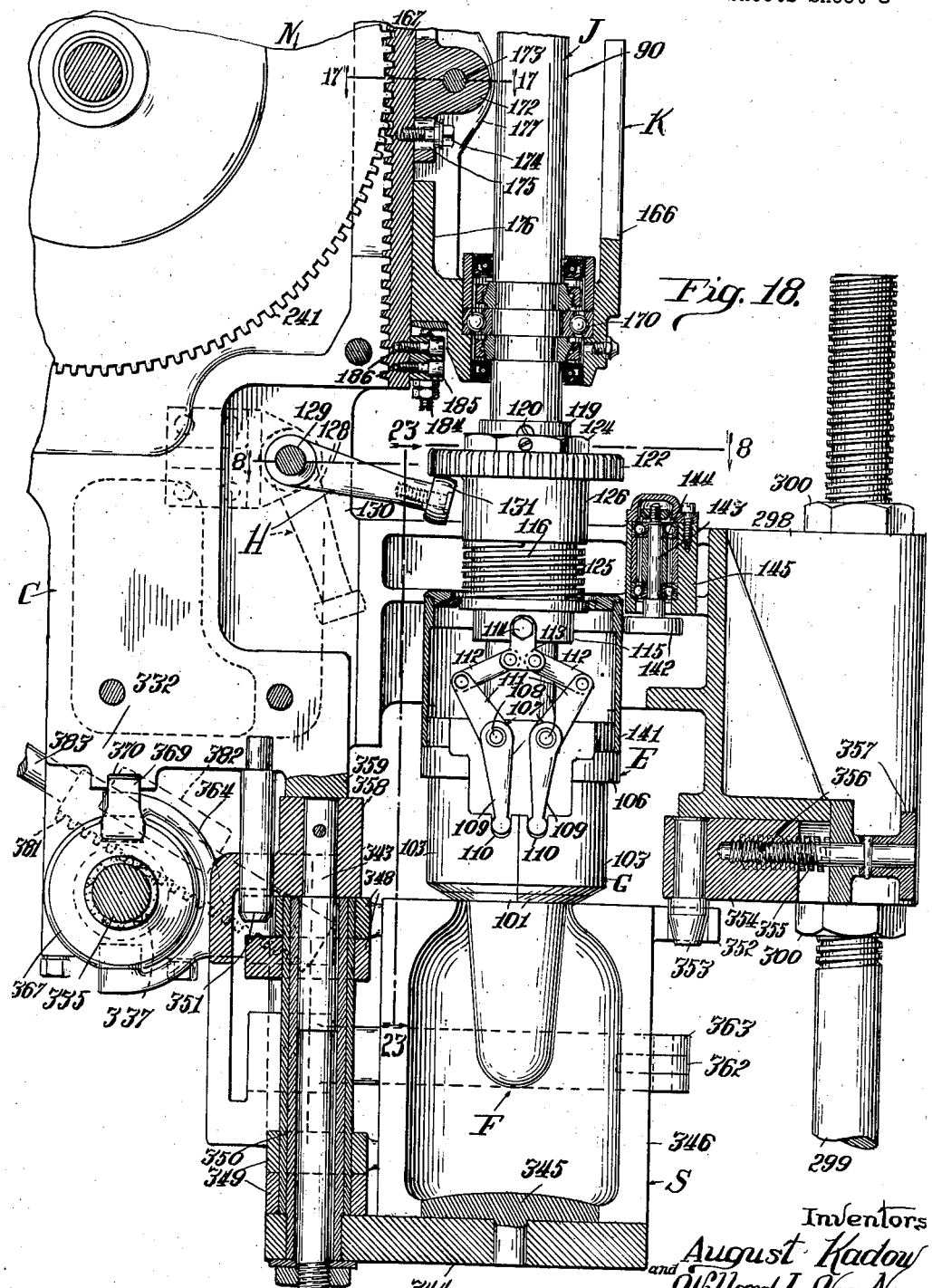
Fig. 18 is a partial vertical section taken substantially on the line 18—18 of Fig. 10, showing the lower portion of the spindle assembly and the blow mold mechanism.

The neck mold opening mechanism H (see Figs. 4, 10, 18, 23, 38, 39 and 40) comprises a lever 128 secured on a horizontal shaft 129 mounted in the downwardly extending bracket 130 of the carriage frame, the lever having a roller 131 at its outer end which is adapted to engage the lower surface of the rotating gear 122 when the spindle assembly is elevated and the lever is swung up to the position shown in solid lines in Fig. 18. When in inoperative position, the lever 128 is swung down to the dotted line position so as to permit the vertical movement of the gathering head assembly. A crank arm 132 on the outer end of shaft 129 is connected by link 133 with the upper arm 134 of a lever pivoted at 135 to the side frame 66 of the carriage, the lower arm 136 of this lever having an extension 137 which projects through an opening 138 in the side frame and carries a roller 139 engaging in the cam slot 79 on cam disk 69. The cam 79 is so formed that at the proper times it will swing the operating lever 128 downwardly to permit reciprocation of the spindle, or swing the lever upwardly so that roller 131 will engage the lower face of the rotating gear 122 and lift this gear upwardly. Since at this time the spindle is fixed against further upward movement, the gear 122 will lift the sleeve 116 (compressing the spring 121), and through the clevises 113 and the toggle and link connections will swing the levers 107 so as to separate the neck ring sections and release the glass article. When the operating lever 128 is again swung downwardly by cam 79, the expanding spring 121 will return the neck mold to its normal closed position.

The spring connection indicated at 140 (see Figs. 4 and 34) between link 133 and the lever arm 134 will permit some additional movement of the cam operated lever 134 after the neck mold has been completely opened so as to insure a complete opening movement without injury to the operating mechanism.

Guide means is provided for properly centering the working head and holding it rotatably in proper position when the spindle is raised to the blowing position (see Figs. 8, 9, 10, 18 and 23). For this purpose a cylindrical drum 141 which is fixed about the upper portion of the working head E engages between a plurality of guide rollers 142 when the working head is elevated. In the example here shown there are three of these guide rollers 142, each carried by a vertical stem 143 journaled in roller bearings 144. Two of these guide rollers are fixedly mounted in portions of the carriage bracket 298 (see Fig. 23). The third roller (see Figs. 8, 9 and 18) is mounted in an arm 145 pivoted in the fixed frame structure at 146, the other end of the arm being normally locked in position by spring pressed plug 147 engaging in an opening 148 in the fixed frame. By pulling up on the operating knob 149, the plug 147 may be released so as to permit this roller 142 to be swung outwardly to facilitate the removal of the working head mechanism.

Referring again to Figs. 14 and 16, an annular passage 150 in the exterior surface of head 92 of form F communicates through a passage or passages 151 with the chamber 152 in the head 92 into which leads the passage 94 in the spindle through which the pressure air or vacuum connections are made. There is a slight clearance at 153, below the annular passage 148, and the lower portion of the head is of reduced diameter at 154. The collar 155 at the lower end of the head, which rests upon the neck ring sections when the plunger is lowered, is slightly cut away at intervals as indicated at 156 in Fig. 17. When the neck ring sections are closed about the head 92 and the plunger is lowered, there is sufficient clearance at 153, 154 and 156 between annular passage 148 and the neck ring opening 2 so that suction may be exerted in this recess 2 to draw molten glass up into the neck ring when the gathering head is lowered to the position shown in Fig. 55. When the plunger F' is raised as shown in Figs. 16 and 59 pressure air may be forced through these passages and about the plunger to expand the blank.

The gathering form F' shown in Figs. 19 and 20 is essentially the same as that heretofore described, with the addition of means for exerting suction at the lower tip and also at the sides of the form to assist in holding the glass blank to the form and preventing the blank from sagging away during the drawing operation. A conduit connection 157 leads from the fluid supply chamber 152 in the head 92 to a plug 158 mounted in the lower end of the gathering form. Branch passages 159 and 160 in this plug lead to a plurality of small ports 161 in the lower surface of the plug so that suction may be exerted at a plurality of spaced points. The openings 161 are too small to permit the molten glass to be drawn thereinto.

In the modifications shown in Figs. 21 and 22, the plug 158' in the form F'' is provided with a pair of crossed slots 162 and 163 which communicate with the suction conduit 157. The suction on the lower end of the blank is exerted through these narrow slots instead of through the several openings 161 as shown in Fig. 20.

Referring again to Fig. 19, suction may be exerted at selected locations along the side walls of the form F' by cutting thin vertical slots 164 at spaced locations in the side wall, each of these slots being connected by a passage 165 with the upper suction chamber 152.

*The spindle and spindle supporting carriage (Figs. 1, 4, 5, 7, 10, 14, 18, 25, 26, 27, 29, 30, 31 and 32)*

The spindle assembly comprises the rotatable spindle mechanism J (the lower portion of which has already been described), the spindle supporting means K comprising the carriage 166 in which this rotatable spindle is journaled and supported, and a vertically reciprocable rack 167 to which carriage 166 is secured, the plunger elevating mechanism L and a non-rotary assembly indicated generally at M for establishing connections for the several operating fluids to the rotating spindle J.

The rack 167 is mounted in a suitable vertical slideway 168 formed in the bracket extension 169 of the frame of the main carriage C.

The anti-friction thrust bearing 170 has its outer portions supported in the spindle carriage 166 and its inner portion secured to the outer sleeve or shell 90 of the rotatable spindle, so that the spindle assembly will be rotatably supported in the carriage 166. The upper end portion of spindle sleeve 90 is also rotatable in the anti-friction bearing 171 mounted in the upper end portion of carriage 166. A supporting block 172 for the locking eccentric 173, is adjustably secured to the rear face of rack 167 by means of bolts 174 passed through slots 175 in the block and screwed into the rack. The spindle carriage 166 has portions 176 bearing in a vertical slideway formed in the back of rack 162, and also has spaced apart vertically extending walls 177 which engage against opposite sides of the block 172. The locking eccentric 173 is formed on the central portion of a bolt or shaft having cylindrical portions 178 and 179 journaled in the two side walls 177, the intermediate eccentric portion 173 being journaled in the supporting block 172. By means of the lever 180 secured on one end of the bolt, it may be rotated to lock the carriage 166 against the rack 167. The eccentric bolt is locked against endwise displacement by means of the screw bolt 181 engaged in an annular groove 182 in the bolt. The upper and lower portions of the carriage 166 are engaged by adjustable clamping bolts 183 and 184 threaded through supporting blocks 185 secured to the rear face of rack 167 by screw bolts 186 (see Figs. 18 and 25).

The plunger elevating mechanism L is enclosed within a housing 187 fixedly mounted on the upper end of carriage 166. The rotatable spindle assembly J projects upwardly through this housing, the outer sleeve or shell 90 (which is not moved vertically by the mechanism L) terminating within the chamber 188 in the bottom portion of housing 187. The next outer sleeve 89 projects upwardly through a packing 189 clamped in place between a gland 190 and an inwardly extending flange or collar 191 in housing 187. Within the main pressure chamber 192 of housing 187, an annular piston assembly is mounted around the rotatable spindle J, this piston comprising a metallic sleeve member 192' which slidably engages the interior of housing 187 adjacent its upper end and engages the spindle sleeve 89 adjacent its lower end, there being a packing 193 between the sleeve and the spindle and a packing means 194 between the sleeve and the housing 187. The lower raceway 195 of a roller bearing 196 is carried by the head 197 of the piston, the upper raceway 198 being carried by a collar 199 anchored within an annular recess in the outer sleeve 89. A second roller bearing assembly 200 is mounted between the lower end of the piston and a ring or collar 201 also anchored within an annular recess in sleeve 89. It will now be apparent that the spindle J is rotatable within the piston assembly, but no relative longitudinal movement is permitted between the sleeve 89 and piston so that when the piston is moved upwardly within chamber 192 the sleeve 89 and plunger F will be lifted with it. The lower end of a compression spring 202 bears against a ring 203 supported at the upper end of sleeve 204 which surrounds the roller bearing 196 and rests upon the head 197 of the piston. The upper end of spring 202 abuts against the lower face of a ring 205 mounted beneath the lower end of a housing 206 secured to the top of housing 187 by bolts 207. The spring 202 is under compression and tends to force the piston and sleeve 89 downwardly so that the head 92 of the plunger F will rest upon the neck mold as shown in Fig. 14, this being the glass-gathering position. When high pressure air is admitted through conduit 208 and inlet port 209 to the chamber 192, the piston will be forced upwardly, compressing spring 202 and lifting the inner group of rotatable spindle sleeves so as to raise the form or plunger F to the position shown in Fig. 16. The plunger remains in this raised position during the greater portion of the cycle of operations, the plunger being lowered before the working head is lowered into the furnace to gather a new blank of glass, and the plunger being raised from the gathering position shown in Fig. 14 to the position shown in Fig. 16 shortly after the blank has been withdrawn from the molten pool, as shown in Fig. 57.

The fluid conduit mechanism M is adapted to conduct the several fluids between the distributing unit X which is fixedly positioned on the carriage B and the rotatable spindle J. The spindle sleeve 89 extends up through the packing 210 in the lower portion of housing 206 into the chamber 211 within this housing. The packing 210 is held in position by a gland 212, and the space beneath this packing is open to the atmosphere through port 213. The upper end of tube 89 is closed by the annular threaded plug 214 which slidably surrounds the next inner sleeve 88. Lateral projections 215 on the tube 88 extend into longitudinal slots 216 in the walls of tube 89 so as to permit relative expansion of the two tubes but cause them to rotate together. A spring 217 is confined between a collar 218 on tube 88 and the closure plug 214. The passage 94 between the tubes 88 and 89 communicates with the chamber 211 in housing 206 through the ports 219 formed in the side walls of tube 89. The supply conduit 220 communicates with chamber 211 through the inlet port 221. Vacuum or low-pressure air are alternatively supplied through the conduit 220, and thence through chamber 211, parts 219 and passage 94 to the working head E as already described. The tube 88 extends slidably and rotatably upward through the packing 222 mounted in the upper end of housing 206. Another housing 223 is fixedly secured at 224 to the upper end of housing 206. Tube 88 extends upwardly through another packing 224' in the lower end of housing 223 into the water discharge chamber 225 within this housing, the upper end of tube 88 being closed by an annular plug 226, and the passage 97 between tubes 87 and 88 communicating with chamber 225 through the ports 227 in the side walls of tube 88. The water discharge conduit 228 communicates through port 229 with the chamber 225. The inner tube 87 of the rotatable spindle assembly extends upwardly through the packing 230 which closes the upper end of housing 223, and then through a second packing 231 in the lower end of a fitting 232 secured to the upper end of housing 223. Water inlet conduit 233 leads into the fitting 232 so as to communicate with the rotatable and longitudinally movable tube 87.

The several conduits 208, 220, 228 and 233 extend up to the distributing head or block 234 which is mounted at the upper end of the rack 167. The four similar flexible conduits 235, 236, 237 and 238 extend between the fixed head 239 of the distributing unit X and the vertically movable head 234 carried at the top of the rack. Each of these conduits preferably comprises a pair of pipe sections which are hingedly connected at their adjacent ends by a fitting 240, the outer end portions of the two pipe sections being pivotally connected through suitable fittings with the respective heads 239 and 234. This permits the vertically movable head 234 to move between the raised position shown in Fig. 4 and the lowered position shown in Fig. 1 without affecting the continuous transmission of fluids through these several conduits. It will be understood that each of these several conduits communicates through a suitable separate passage in head 234 with one of the four conduits leading to the distributing mechanism M on the spindle assembly.

*The spindle raising and lowering mechanism (Figs. 4, 10, 18, 29 and 40)*

The spindle reciprocating mechanism N comprises a main raising and lowering gear 241 which meshes with the rack 167, the gear being rotatably mounted on bushing 242 surrounding the shaft 243 mounted in anti-friction bearings 244 and 245 in the carriage frame. A driving disk 246 is also rotatably mounted on a bushing 242' at one side of the gear 241. A driving rack 247 is longitudinally reciprocable in slideways 248 in the carriage frame, a roller 249 mounted on this rack engaging in the cam slot 67 carried by the main driving gear 62. The gear or pinion 250 which is slidably keyed on the shaft 243 is continuously in mesh with rack 247. The adjacent faces of pinion 250 and driving disk 246 have cooperating clutch teeth 251 formed thereon which are normally in engagement so that the driving disk will rotate with the pinion at all times in either direction. However, the pinion 250 may be moved longitudinally of shaft 243 out of engagement with the driving disk 246 by means consisting of a yoke 252 engaging in the annular slot 253 at one end of the pinion, the yoke being formed on the lower end of a crank-arm 254 fixed on shaft 255 journaled in portion 130 of the carriage frame. (See Fig. 40.) The pinion 250 will normally remain clutched to the driving disc 246 but may be unclutched by means of hand-lever 256 fixed on shaft 255 when permitted by the positioning of the emergency elevating means P, as hereinafter described.

Means is provided for alternatively clutching the driving gear 241 to the driving disc 246 so that it will be rotated thereby, or for locking the driving gear to the fixed frame and permitting the driving disk 246 to rotate idly. A pair of aligned passages in the machine frame in which the actuating pins 257 and 258 are slidably mounted align with similar openings or passages in the gear 241 and disk 246 when these elements are in the position shown in Fig. 10. A pair of clutch pins 259 and 260 are interposed in these passages between the actuating pins 258 and 257. When the parts are in the position shown in Fig. 10, the pin 259 is positioned in the passages in the gear 241 and disk 246 so as to lock these members together to rotate as a unit. If these pins are shifted towards the near side of the machine, as seen in Fig. 10, the pin 260 will be positioned within the passage in disk 246 so as to permit this disk to rotate freely, and the pin 259 will be partially within the gear 241 and partially within the fixed frame hub 261, so as to lock the gear 241 against rotation. A longitudinally slidable shaft 262 mounted in the carriage frame is actuated by a bracket arm 263 on which is mounted a roller 264 which engages in the drum-cam 83 mounted on the periphery of cam disk 68. Bracket arms 264' and 265 extending from shaft 262 carry adjustable set screws 266 engaging the outer ends of the actuating clutch pins 257 and 258.

It will be remembered that the main driving gear 62 makes three rotations while the cam disk 68 is rotating once. Consequently there will be three rotations of the spindle-actuating cam 67 to one rotation of the clutch-pin actuating cam 83. Assuming that the clutch pins are in the operating position shown in Fig. 10, a longitudinal movement of rack 247 caused by the rotating cam 67 will cause the pinion 250, disk 246 and driving gear 241 to rotate as a unit, thus either elevating or lowering the rack 167 and the spindle assembly carried thereby. Assuming that the spindle is initially in the raised position shown in Fig. 4, the cam groove 67 is so shaped that it will first cause a slight raising of the spindle assembly to release the plunger from the finished glass article, it will then lower the plunger rather rapidly to the gathering position shown in Fig. 1, there follows a concentric portion of the cam permitting a short dwell of the gathering plunger within the glass, then the plunger is raised rather quickly to the original position after which a second longer concentric portion of cam 67 permits the parts to dwell in this raised position. At this time the clutch pins 259 and 260 are in alignment with the actuating pins 257 and 258 and the clutch pins are shifted during this latter dwell. The cam 83 on cam disk 68 is so shaped that the clutch pins will be shifted during every third dwell of cam 67 and rack 247 with the spindle in its raised position. It will now be apparent that there will be two idle cycles of operation of the cam 67, rack 247, pinion 250 and driving disk 246. During these two idle cycles the gear 241 will be locked to the carriage frame and the spindle assembly held in its raised position. It is at this time that the blowing operation is taking place. During the third cycle, the pins 259 and 260 will be shifted to the positions shown in Fig. 10 so that the gathering head will be lowered, a new blank gathered, and the gathering head again raised to the blowing position.

*The emergency elevating means (Figs. 4, 11, 12, 13, 25, 29 and 40)*

The emergency elevating means P comprises a gear or pinion 267 keyed on a short shaft 268 journaled at one end in a bearing 269 in the frame 169 and journaled at the opposite end in bearing 269' positioned within the sleeve member 270 slidably and rotatably mounted in frame 169. The gear 267 is constantly in mesh with the elevating rack 167. Cooperating clutch teeth 271 and 271' are formed on the adjacent ends of gear 267 and sleeve 270 but the sleeve is normally held in the withdrawn position shown in Fig. 11 by means of a spring-pressed ball clutch 272 which engages in an annular channel 272' in the sleeve. An operating lever 273 is mounted through a ratchet clutch 274 on the outer end of a stud shaft 275 extending from the closed outer end of sleeve member 270. By pushing inwardly on the slidable sleeve member 270, the clutch teeth 271 and 271' may be engaged after which oscillation of the handle or lever 274 will rotate the sleeve 270 and gear 267 to elevate the rack 167 and the spindle assembly and plunger head carried thereby. A spring-held pawl 276 engages a series of ratchet teeth 276' on sleeve 271 to prevent reverse rotation of sleeve 271. A crank-arm 277 secured in one end of the shaft 255 carries a set-screw 278 which normally rests on the enlarged hub 279 at the inner end of shaft 275 (see Fig. 13). With the parts in the normal positions shown in Figs. 11 and 12 the engagement of set-screw 278 within the hub 279 prevents swinging the shaft 255, and the main clutch 251 between gear 250 and the rotary disc 246 will be held in closed position.

In case the main elevating and lowering mechanism N should fail to function properly or the machine should stop with the working head lowered into the glass pool, the emergency elevating means may be connected for service by pushing in the sleeve 270 thus connecting the operating shaft 275 with the gear 267. The main clutch 251 may now be thrown out by swinging the crank 256, since the hub 279 is no longer beneath the set-screw 278 (see dotted lines Fig. 13). This will disconnect the main elevating and lowering mechanism N. The spindle assembly may now be elevated by oscillating the handle 273, the parts being held by pawl 276 in the position to which they are elevated.

*The spindle rotating mechanism (Figs. 10, 14, 18, 23, 24, 28 and 49)*

The spindle rotating mechanism O comprises the gear 122 carried by the working head E, as already described, and a constantly rotating gear 280 mounted on vertical shaft 281 rotatable in bearings 282 and 283 in the housing 284 carried by the fixed carriage frame adjacent the raised position of the working head E. In other words, when the working head is raised to the blowing position as shown in Fig. 23, the gear 122 on the spindle will move into mesh with the driving gear 280 and the rotatable portion of the spindle and the working head assembly will be rotated. When the working head is moved down into the furnace to gather a new blank of glass, the rotation of the spindle and working head ceases. The upper edges of the teeth on gear 122 and the lower edges of the teeth on gear 280 are beveled as indicated at 285 so as to facilitate the meshing of the gears. Also, as already described, the gear 122 is carried by a sleeve 126 which can slide downwardly against the resistance of spring 125, thus permitting the gear 122 to move downwardly relative to the spindle assembly in case the gears 122 and 280 do not immediately mesh properly thus avoiding clashing and stripping of the gears.

The driving gear 280 is constantly rotated through the driving connections consisting of beveled gear 286 mounted on shaft 281 and meshing with bevel pinion 287 on the inner end of shaft 288 journaled in housing 284 and connected at its outer end through universal joint 289 with one end of shaft 290. The other end of shaft 290 (see Figs. 28 and 49) is connected through universal joint 291 with the outer end of a short shaft 292 journaled in bearings 293, the inner end of this shaft carrying a bevel pinion 294 meshing with bevel pinion 295 on the horizontal shaft 296 journaled in the carriage frame. The pinion 297 on the inner end of shaft 296 meshes with the constantly rotating main driving gear 62.

*The cut-off mechanism (Figs. 1, 2, 3, 4, 5, 10, 18, 33, 34, 35, 36 and 58)*

The main assembly of the cut-off device Q is suspended from the extension 298 of the carriage frame by the two vertically extending rods 299, the upper threaded portions of which extend through the frame member 298 and are held adjustably in place by the nuts 300 so that the cut-off shears will be supported directly above the draw-opening 14 in the top of the furnace, as shown in Fig. 1. The main frame 301 carried by rods 299 carries a shear-supporting frame comprising the inwardly converging arms 302 which are vertically adjustable by means of screws 303. A hollow tubular shaft 304 is journaled in the inner end portion of each arm 302, one of the swinging arms 305 which carries one of the knives or shears 306 being secured by bolts 307 to the lower end of each hollow shaft 304. The two hollow shafts 304, and the arms 305 carried thereby, are adapted to be rotated in unison but in opposite directions toward or from one another by means of the intermeshing gear sectors 308 secured to the respective shafts. When the arms 305 are swung together from the open position shown in Fig. 35 to the closed position shown in Fig. 33, the knives 306 will be moved over one another as shown in Figs. 33 and 36 to sever the trailing glass 4 beneath the blank 3 (see Fig. 58). A tube 308' extends downwardly through a packing 309 in the upper end of shaft 304 to communicate with chamber 310 within the lower end of the shaft. The upper end of tube 308' is secured in a casting 311 enclosing a chamber 312 into which leads a water inlet pipe 313. A water discharge pipe 314 leads upwardly through the central portion of tube 308 and through a packing 315 in the upper end of casting 311 and communicates with a water outlet chamber 316 from which leads the water discharge pipe 317. Suitable flexible connections are made with the water supply and discharge pipes 313 and 317 and with the water supply and discharge pipes on the carriage C as hereinafter described, so as to provide a continuous flow of cooling water through each of the knife units. Each of the knife supporting arms 305 is formed with connected inlet and outlet water circulating passages 318 and 319 which communicate respectively with the chamber 310 and discharge pipe 314 so that a continuous flow of cooling water will flow through each of the knife supporting arms.

A crank arm 320 is adjustably connected at 321 with one of the vertical shafts 304, the outer end of this crank being pivotally connected at 322 with one end of a link 323, the opposite end of this link being adjustably connected at 324 with the downwardly extending arm of a bell-crank 325 pivoted in the frame at 326, the shorter arm of the bellcrank carrying a roller 327 which engages the cam 85 secured on one end of the main driving shaft 64. A tension spring 328 anchored at one end 329 to the machine frame and at the other to the longer arm of the bellcrank 325 normally tends to swing the operating members so as to close the cut-off knives or shears, as shown in Fig. 33. The cam 85 will move these operating parts in the other direction so as to open the shears as shown in Fig. 35.

As has already been described in connection with the furnace structure, the air-jet device R operates immediately after the cut-off knives have closed to blow the trailing glass 4 aside so that it will not form part of the next glass blank to be drawn. The air under rather high pressure is supplied to the spout 18 of this blow-off device through a flexible conduit 330 and a normally open valve 331 by which the air stream may be adjusted or cut-off when desired. The supply of air to this air-jet is regulated by an automatically actuated valve in the distributing unit X, hereinafter described.

*The blow-mold mechanism (Figs. 1, 4, 10, 18, 37, 40 to 45, 53, 59, 60 and 61)*

The finishing mold or blow-mold assembly indicated generally at S is suspended from a downwardly extending yoke portion 332 of the carriage frame bracket 130, this yoke being formed with a pair of downwardly extending horizontally aligned bearings 333 and 334. The horizontal shaft 335 is journaled adjacent one end in the bearing 333, and its opposite end portion is rotatably journaled in the sleeve 336 which is rotatably journaled in the bearing 334. The gear 337 of the mold-opening and closing mechanism is keyed on one outer end of the shaft 335, and the operating gear 338 for the mold-swinging mechanism is formed on the opposite outer end of the sleeve 336. The swinging mold supporting frame 339 is in the form of a yoke having one arm 340 journaled on the shaft 335 adjacent the bearing 333, and the other arm 341 keyed at 342 to the sleeve 336. The mold carriage 339 carries the fixed pin 343 on the lower end of which is carried the bottom plate 344 which supports the bottom section 345 of the mold. The main portion of the mold is split vertically into two similar half sections 346 and 347, each of which has upper and lower arms 348 and 349 pivotally mounted on bushings 350 surrounding the supporting pin 343. When the mold sections are in closed position as shown in Figs. 18 and 41, extensions of the upper arms 348 will engage a centering pin 351 fixed in the supporting bracket 130. At the opposite or front sides of the two mold sections, extensions 352 are adapted to engage opposite sides of an adjustable centering pin 353 mounted in a block 354 movable in slideways in the fixed frame bracket 298. Springs 355 tend to move this block 354 inwardly, while it may be adjusted outwardly by means of screw 356 operable by the adjusting knob 357. The centering pins 351 and 353 tend to properly align the blow-mold with the neck-mold and spindle, and a stop projection 358 on the mold carriage 339 engages a fixed stop 359 to limit the upward swinging movement of the mold assembly.

A pair of similar mold-section swinging levers 360 are intermediately pivoted in the carriage 339 on pins 361, the outer ends of the longer arms of these levers being connected by links 362 with ears 363 on the respective mold sections. The shorter arms of these levers 360 are in the form of yokes 364 each having a pair of inwardly extending pins 365 which engage in the annular groove 366 of a nut 367 operable on one of the two oppositely threaded portions 368 of shaft 335. Each nut 367 has a lug or key 369 slidable in a keyway 370 formed in the fixed supporting yoke 332 (see Fig. 40). This will prevent rotation of the nuts when shaft 335 is rotated. When shaft 335 is rotated in one direction it will move the two nuts 367 away from one another so as to close the mold, all as shown in solid lines in Fig. 41. When shaft 335 is rotated in the opposite direction, the nuts will be moved toward one another so as to swing the levers 360 and open the mold, all as shown in dotted lines in Fig. 41.

A short rack 371 fixed at the lower end of an operating rod or pitman 372 is movable in a slideway 373 carried by the supporting yoke 332 and meshes with the pinion 338 on the mold-swinging sleeve 336. The operating rod 372 projects slidably through a slide block 374 mounted in a slideway 375 carried by the carriage side frame 66, a roller 376 on slide block 374 engaging in the face-cam 81 carried by cam disk 68. Nuts 377 on the end of rod 372 limit the outward movement of the rod, and a compression spring 379 confined between block 374 and a collar 380 on the rod 372 yieldably limit movement of the rod in the other direction. The cam slot 81 is so formed that at the proper time in the operating cycle, that is after the glass article has been blown to finished form, the slide-block 374 will be drawn inwardly or toward the axis of the operating disk 68, thus pulling upwardly on the rod 372 and swinging the mold assembly from the operating position shown in Fig. 8 to the inverted inoperative position shown in Figs. 1 and 44. When a new glass blank has been gathered and the spindle has been elevated, a raised portion of cam 81 will push the block 374 outwardly so as to swing the mold back to the operating position shown in Fig. 4. When the mold has been stopped in proper operating position, a slight excessive outward movement of the operating slide 374 caused by cam 81 will compress the spring 379 so as to forcibly hold the mold in this operating position.

A second rack 381 which meshes with the mold opening and closing pinion 337 is movable in a guide-way 382 formed on supporting frame 332, the rack being carried at the lower end of an operating rod 383 which is connected through mechanism exactly similar to that already described for rod 372 with a slide 384 having a roller 385 engaging in the cam slot 78 carried by the cam disk 69. This cam is so shaped that as the mold assembly is swung from its operative to its inoperative position, the mold sections will be opened, and as the mold is swung back to operative position the mold sections will be closed. The spring 386 will be compressed in a manner that will now be apparent in order to hold the mold forcibly in closed position.

*The take-out mechanism (Figs. 1, 4, 10, 44, 45, 48 and 61)*

The take-out mechanism T which is adapted to receive and dispose of the finished glass articles when released from the blow-mold S comprises a trough or chute mounted on the rods 388 secured on horizontal shaft 389 which is journaled in the bracket arms 390 projecting downwardly from the carriage frame. A pinion 391 secured on one outer end of shaft 389 meshes with a short rack 392 movable in a fixed slideway 393 carried by one of the brackets 390. The operating rod 394 projects through rack 392, and a spring 395 confined between one end of rack 392 and the nuts 396 on the end of rod 394 forces the rack against a stop 397 on the operating rod. The upper end of rod 394 projects through an outwardly extending portion 398 of a slide 399 movable in slideways 400 carried by the carriage side frame. Nuts 401 on the upper end of the rod engage one side of slide projection 398, and a spring 402 is confined between the other side of this projection and a stop collar 403 secured on the rod. A cam roller 404 carried by slide 399 projects into the cam slot 82 carried by cam disk 68.

When the mold S is in blowing position beneath the working head E the chute 387 is moved into horizontal position as shown in Fig. 4. As the mold is swung downwardly and opened, the finished glass article 5 will be dropped out on this chute as shown in Fig. 61. After the molds S has swung back to its inverted and opened position, the chute 87 will be swung up as indicated in Figs. 45 and 48 so as to slide the glass article out into any suitable receiving means.

*The mold spraying mechanism (Figs. 1, 4, 44, 45, 46 and 47)*

The mold spraying and cooling mechanism U comprises a pair of similar sprayers 405 each carried by an adjustable arm 406 mounted on the transverse rod or shaft 407 secured to the brackets 390. Each sprayer will be so mounted as to direct its spray into the interior of one of the mold sections 346 or 347 when this mold is inverted and opened as shown in Fig. 45. One of the sprayers is shown in section in Figs. 46 and 47. The spraying nozzle 408 having the central discharge opening 409 is screwed into the main casing 410 at 411. The compressed air tube 412 is screwed into the main casing at 413 so that its discharge nozzle 414 may be adjusted toward or from the rear face of the main discharge nozzle 408. The air tube 412 may be adjusted by means of the knob or handle 415 on its outer end, the tube passing through a pair of packings 416 and 417 which are held apart by the interposed spring 418. The nipple 419 secured in one side of casting 410 communicates with the flexible conduit 420 through which compressed air is supplied, and communicates through port 421 with the interior of air tube 412. Water is supplied through flexible conduit 422, nipple 423, passage 424 in casing 410 and the space around the air nozzle 414 to the discharge opening 409. When compressed air and water are simultaneously supplied to this spraying device, a diverging jet of water will be projected from the sprayer into the interior of one of the mold sections, as indicated in dotted lines in Fig. 45.

It is desirable to prevent dripping of water from the discharge nozzle 408 onto the take-out chute 387 (since this chute contacts directly with the hot glass articles), and for this purpose a partially closed housing 425 is formed about the nozzle, the housing having a large opening 426 through which the spray is projected. A drain pipe 427 leading to any suitable place of discharge connects with the drain opening 428 in the bottom of housing 425.

The flexible supply pipes 420 and 422 from each of the spraying devices connect into the horizontal pipes 429 and 430 carried by the brackets 390. Conduits 431 and 432 lead from one end of the pipes 429 and 430 up to the cam operated distributing valve 433 positioned on one of the carriage side frames adjacent the rotary cam 86 carried by shaft 64. Supply pipes 434 and 435 for the air and water lead downwardly from the main supply pipes (hereinafter described) to the distributing valve 433. A lever 436 pivoted on the frame at 437 carries a roller 438 which is engaged by the cam 86 so as to lift the lever 436 against the outwardly projecting valve stems and open the valve to permit water and air to flow to the sprayers 405. The cam 86 will be so positioned that the valves will be opened and the sprayers will operate after the mold has been moved to the inverted and opened position shown in Fig. 45, and the flow of air and water will be cut off before the mold is again moved to closed and operative position.

*The cooling air system (Figs. 1, 53 and 54)*

This cooling air system W comprises a main supply conduit 439 positioned on the inner ends of the horizontal supporting beams 44, and constantly supplied with cooling air under low pressure from any suitable blowing device. Similar conduits 440 lead rearwardly and downwardly from the supply conduit 439, at each side of the spindle mechanism. Each of these conduits 440 engages telescopically at 441 with the upper end of a similar conduit 442 supported on one of the transverse beams 443 of the furnace frame. Nozzle openings 444, 445 and 446 extending from the conduit 442 are adapted to project streams of this cooling air against the working head E, the drawn glass blank 3, and the finishing molds S. A rearwardly projecting nozzle 447 extending from each of the vertical conduits 442 is adapted to project cooling air against the blow molds when in inverted and inoperative position. Suitable slide valves such as shown at 448 are adapted to cut off or control the flow of air through the vertical supply conduits 442, and similar valves 449 are provided for controlling the flow of air through each of the discharge nozzles.

*The fluid control mechanism (Figs. 1, 4, 7, 49, 50, 51 and 52)*

The valved connections which have been indicated generally at X are adapted to control the supply of operating fluids (vacuum, low pressure air, high pressure air and water) to the several mechanisms previously described. The several working fluids are transmitted to or from the machine through the looped hose or pipe connections indicated generally at 450 in Fig. 1, which connect with the rear end of the movable supporting carriage and are looped back and supported near the rear ends of the horizontal frame beams 22 and lead from there to suitable sources of supply. In a similar manner the looped conduit 451 contains the electric wires for supplying current to the operating motors 48 and 58. Referring now to Fig. 7, the hose connections 452, 453 and 454 respectively supply low pressure air, vacuum, and high pressure air to the supply conduits on the carriage. Cooling water flows in through pipe 455 and is discharged through pipe 456. The water supply and discharge pipes 457 and 458 extend along the near side of the carriage as seen in Fig. 4, and the extensions 459 and 460 of these pipes lead through suitable flexible connections to the cooling mechanism of the cut-off device Q as already described. The pipe 435 leads from supply pipe 457 to supply water to the distributing valve 433 for the mold-sprayers U. Branch pipes 461 and 462 lead from the supply and discharge pipes 457 and 458 into the distributing block 463 having interior passages 464 and 465 which lead respectively to the hinged conduits 238 and 236 through which cooling water is respectively delivered to and discharged from the spindle and plunger as already described.

The pipes 466, 467 and 468 which respectively conduct high pressure air, vacuum and low pressure air, lead along the opposite side of the machine and connect into the opposite side of the distributing block 463. The passages 469 and 470 in the distributing block 463 lead from the high pressure supply pipe 466 to the two valves 471 and 472 respectively. Valve 471 controls the flow of high pressure air to the cut-off air jet R, the supply pipe 330 leading from valve 471 to this air jet device. The discharge passage 473 leading from valve 472 extends upwardly through the distributing block 463 and connects with the hinged conduit 235 which supplies high pressure air to the plunger elevating mechanism L, as already described. A suitable connection is also made at 474 between the high pressure air supply pipe 466 and conduit 434 which supplies air to the distributing valve 433 for the mold sprayers U.

The vacuum supply pipe 467 connects with the passage 475 in distributing head 463 which leads to the vacuum control valve 476, the outlet of which connects through passage 477 with the hinged conduit 237 leading through the spindle to the working head E. The low pressure air supply pipe 468 connects through a passage 478 in the distributing block 463 with the low pressure air control valve 479 from which the outlet conduit 480 leads into passage 477 and thence over the same path as the vacuum to the working head. The outlet of low pressure air valve 479 also connects through an auxiliary passage 480' with the air-release valve 481 which has an outlet discharging to the atmosphere. This latter valve is adapted to relieve the blowing pressure at intervals, as well known in this art.

The several valves 471, 472, 476, 481 and 479 are all of the same general type, each comprising a movable valve member 482 which is normally held against its seat by spring 483 but which may be opened by lifting the downwardly projecting valve stem 484. Each of these valves is adapted to be opened by a bellcrank mechanism such as indicated in Fig. 52, comprising a lever arm 485 carrying an adjustable screw 486, the head of which is adapted to be swung up against the lower end of the valve stem 484 to open the valve. The downwardly projecting arm 487 of each bellcrank carries a roller 488 adapted to be engaged by one of the cams 80 mounted on the periphery of cam disk 69. It will be apparent from Figs. 50 and 51 that all of the downwardly projecting arms 487 of the several bellcrank mechanisms are positioned closely adjacent one another adjacent one of the carriage side frames 66, but the horizontally projecting arms 485 of the bellcranks are connected with the respective downwardly extending arms 487 by a series of nested sleeves 489 of different lengths all rotatable about the central shaft 490. This applies to all of the valve operating mechanisms with the exception of valve 471 which is operated by cam 84 positioned on the cam disk 68. The bellcrank 491 which operates this valve is formed as a unit and is journaled on the end portion of shaft 490 adjacent the other carriage side frame 66.

Operation

It is believed that the general operation of the machine should now be apparent, but by way of résumé the consecutive operations taking place through one complete cycle of operations will now be briefly described. It will be understood that the cooling water flows continuously through the several devices as already described, and that the cooling air flows continuously through the cooling system W. It will be assumed that a blowing operation has just been completed and one of the glass articles has been finished within the blow-mold as shown in Fig. 60. The lever 128 and roller 131 will now be elevated to lift the gear 122 and open the neck mold G. The clutch pin 258 will be shifted to the position shown in Fig. 10 so as to lock gear 241 to the driving disk 246 and complete the spindle raising and lowering connections N. The spindle assembly is now moved up a short distance so as to release the plunger from the finished glass article (as shown in Fig. 60) and the blow-mold S starts to swing down. The neck mold lever 128 is now swung down to permit the neck-mold to close, and the spindle moves down to lower the gathering head E into the draw-pot. The cut-off knives Q are opened to permit the spindle mechanism to pass downwardly, and the plunger or form F is lowered within the gathering head into engagement with the neck-mold G, as shown in Fig. 14. As the spindle moves downwardly, the mold F is swung back and opened to release the finished glass article onto the take-out chute 387 which then swings up to discharge the article. When the gathering head reaches its extreme lowered position as shown in Fig. 1, with the plunger immersed in the molten pool, it dwells for a very short time, and the vacuum valve 476 is opened to cause glass to be sucked up into the neck-mold, and also to assist in the blank-gathering operation. The spindle then starts up and soon thereafter valve 472 is opened to admit high pressure air to the plunger elevating mechanism L which withdraws the plunger from the blank, as shown in Figs. 16 and 57, and the plunger remains in this elevated position during the remainder of the cycle. When the head E reaches the proper elevation the cut-off knives Q are closed to sever the trailing glass 4, and valve 471 is opened to admit high pressure air through the cut-off air jet R to assist the throwing action of the cut-off knives in disposing of this trailing glass. At about this time the valves 479 and 481 are successively opened and closed to admit puffs of air into the suspended blank to partially expand it. During this portion of the cycle the spraying mechanisms U have been spraying or atomizing water into the opened and inoperative blow-mold S. This spraying device is particularly adapted for moistening or steaming paste-molds, but it has the added function of cooling the molds between successive blowing operations. These sprayers are then cut off and the blow-mold starts to swing back toward its operative position. As the spindle and gathering head reaches its upper blowing position, the spindle rotating gears 122 and 280 move into mesh with one another to cause a continuous rotation of the suspended glass blank, which rotation continues throughout the blowing operation. If the paste-molds are not used the spindle-rotating mechanism may be disconnected. After the spindle and working head has reached this raised position, the clutch pin 259 is shifted so as to lock the gear 241 to the fixed frame structure 261 and hold the spindle assembly in this raised position during the comparatively long dwell while the blowing operation is taking place. During this time the blow-mold has been swung up and closed about the blank with the upper end of the blow-mold in operative engagement with the lower surface of the neck-mold which suspends the blank, and valve 479 is now opened to admit low pressure air to the blank so as to expand this to form within the blow-mold. This completes one cycle of operations, and this cycle of operations will now be repeated as enumerated hereinabove.

It will be understood that by simply changing the shape of the cam-path 67 which operates the spindle raising and lowering mechanism N, the time during which plunger F dwells in the molten glass, and the speed with which it is withdrawn therefrom can be varied as desired. The plunger may be partially withdrawn at one speed and the withdrawal completed at a slower speed to provide a thicker wall on the lower portion of the blank. By providing an added dip on the cam the plunger may be re-dipped or partially re-dipped to add to the thickness of the blank.

It will also be understood that the cut-off mechanism Q is vertically adjustable by means of screws 299, and the timing of the cut-off operation may also be adjusted with respect to the timing of the spindle-raising mechanism. By this means it is possible to adjust the amount of glass severed from the lower end of the blank and thus control to some extent the total weight of the glass blank and the distribution of glass in the lower portion of the finished article.

It will be noted that the glass working operation itself is quite simple, there being only one neck-mold and one blow-mold used. There is no transfer of the original glass blank from one mechanism to another, the neck of the article being originally formed in the neck mold during the blank-gathering operation, and the initially hollow glass blank being moved directly into the blow-mold wherein it is expanded to finished form. No portion of the original glass blank is cut off or discarded (with the exception of the small string of trailing glass 4 which is returned directly to the furnace), the entire blank being utilized to form the finished article.

We claim:

1. Apparatus for gathering an initially hollow glass blank from a pool of molten glass comprising a plunger on the exterior surface of which the blank is formed, means for lowering the plunger into the pool and withdrawing it therefrom, means for internally cooling the plunger while it is within the pool so as to withdraw heat from the glass through the plunger, means for forming a neck-portion on the blank adjacent the surface of the pool and for lifting the blank from the pool and supporting the blank from this neck portion, and means for lifting the plunger from contact with the interior of the blank.

2. Apparatus for gathering an initially hollow glass blank from a pool of molten glass comprising a plunger on the exterior surface of which the blank is formed, a neck mold positioned about the upper portion of the plunger, means for supporting the plunger and neck mold, means for raising and lowering the supporting means to immerse the plunger in the glass pool and bring the neck mold into position adjacent the surface of the pool, suction means for drawing a portion of the blank into the neck mold, means for withdrawing heat through the plunger, and means for elevating the plunger within the supporting means to lift the plunger out of contact with the interior of the blank.

3. In a glass forming machine, a spindle, a gathering head supported at the lower end of the spindle, said head comprising a plunger and a sectional neck mold positioned about the upper end of the plunger, means for lowering and raising the spindle to submerge the plunger in a pool of molten glass and bring the neck mold adjacent the surface of the pool, means for exerting suction in the neck mold, and means comprising passages in the spindle for circulating a cooling fluid through the plunger.

4. In a glass forming machine, a spindle, a gathering head supported at the lower end of the spindle, said head comprising a plunger, means for lowering and raising the spindle so as to submerge the plunger in a pool of molten glass, and means comprising passages in the spindle for circulating a cooling fluid through the interior of the plunger.

5. In a glass forming machine, a spindle, a gathering head supported at the lower end of the spindle, said head comprising a plunger and a sectional neck mold positioned about the upper end of the plunger, means for lowering and raising the spindle so as to submerge the greater portion of the plunger in a pool of molten glass and bring the neck mold adjacent the upper surface of the pool, said neck mold comprising sections movable toward or from one another, means for successively exerting suction and fluid pressure through the spindle and head, a sleeve slidably keyed on the head, means for raising and lowering the sleeve relative to the head, and lever and link connections between the sleeve and neck mold sections for opening and closing the mold.

6. In a glass forming machine, a spindle, means for raising and lowering the spindle, a gathering head supported at the lower end of the spindle, said head comprising a plunger and a sectional neck mold positioned about the upper end of the plunger, said neck mold comprising sections movable toward or from one another, means for successively exerting suction and fluid pressure through the spindle and head, a sleeve slidably keyed on the head, means for rotating the spindle comprising a gear on the sleeve, lever and link connections between the neck mold sections and sleeve, and means engageable with the gear to reciprocate the sleeve and open the mold.

7. In a glass forming machine, a spindle, a gathering head supported at the lower end of the spindle, said head comprising a plunger, horizontal slideways in the head, a neck mold positioned about the upper end portion of the plunger and comprising sections mounted in the slideways for lateral movement toward or from one another, means for lowering and raising the spindle so as to submerge the greater portion of the plunger in a pool of molten glass and bring the neck mold adjacent the upper surface of the pool, means for successively exerting suction and fluid pressure through the spindle and head, a sleeve slidably keyed on the head, connections between the sleeve and mold sections to move the sections in the slideways, and means for sliding the sleeve relative to the head to open or close the mold.

8. In a glass forming machine, a spindle, a gathering head supported at the lower end of the spindle, said head comprising a plunger and a sectional neck mold positioned about the upper end of the plunger, said neck mold comprising sections movable toward or from one another, means for lowering and raising the spindle so as to submerge the greater portion of the plunger in a pool of molten glass and bring the neck mold adjacent the upper surface of the pool, means for circulating a cooling fluid through the spindle and plunger, means for successively exerting suction and fluid pressure through the spindle and head, a sleeve slidably keyed on the head, means for raising and lowering the sleeve relative to the head, and lever and link connections between the sleeve and neck mold sections for opening and closing the mold.

9. In combination with a pool of molten glass, a blank gatherer and former, means for projecting the gatherer partially into the pool and withdrawing it therefrom, and means for internally cooling the submerged portion of the gatherer so that a glass blank of controlled dimensions will be removably formed within the pool on the exterior of the gatherer, the unsubmerged portion of the gatherer comprising means for forming and engaging the open upper end of the blank directly above the surface of the pool for lifting the blank from the pool and suspending the blank.

10. In combination with a pool of molten glass, a blank gatherer and former, means for projecting the gatherer partially into the pool and withdrawing it therefrom, and means for internally cooling the submerged portion of the gatherer so that a glass blank of controlled dimensions will be removably formed within the pool on the exterior of the gatherer, a sectional mold, means for bringing the mold into position about the blank, and means operable through the gatherer for blowing the blank to shape within the mold.

11. In combination with a pool of molten glass, a spindle, a plunger at the lower end of the spindle, a sectional neck mold enclosing an upper portion of the plunger, means for reciprocating the spindle to submerge the plunger in the pool and bring the neck mold into proximity to the surface of the pool, means for controlling the temperature of the plunger and means for exerting suction through the spindle whereby a glass blank will be formed in the neck mold and on the exterior surface of the submerged plunger.

12. In combination with a pool of molten glass, a spindle, a plunger at the lower end of the spindle, means for reciprocating the spindle to submerge the plunger in the pool and withdraw it therefrom, means for controlling the temperature of the plunger so that a glass blank of controlled dimensions will be removably formed within the pool on the exterior of the submerged plunger, a sectional blow mold, means for moving the blow mold into position about the blank, and fluid pressure means operable through the spindle for expanding the blank to form within the blow mold.

13. In combination with a pool of molten glass, a spindle, a plunger at the lower end of the spindle, a sectional neck mold enclosing an upper portion of the plunger, means for reciprocating the spindle to submerge the plunger in the pool and bring the neck mold into proximity to the surface of the pool, means for controlling the temperature of the plunger and means for exerting suction through the spindle whereby a glass blank will be formed in the neck mold and on the exterior surface of the submerged plunger, a sectional blow mold, means for moving the blow mold into position about the blank, and fluid pressure means operable through the spindle for expanding the blank to form within the blow mold.

14. In combination with a pool of molten glass, a spindle, a plunger at the lower end of the spindle, means for reciprocating the spindle to submerge the plunger in the pool and withdraw it therefrom, and means for circulating fluid through the spindle and plunger to control the temperature of the plunger so that a glass blank of controlled dimensions will be formed within the pool on the exterior of the plunger.

15. In combination with a pool of molten glass, a spindle, a plunger at the lower end of the spindle, a sectional neck mold enclosing an upper portion of the plunger, means for reciprocating the spindle to submerge the plunger in the pool and bring the neck mold into proximity to the surface of the pool, and means operable through the spindle for circulating cooling fluid through the plunger and for successively exerting suction and fluid pressure through the neck mold and plunger so that a glass blank will be formed in the neck mold and on the exterior surface of the submerged plunger, and this blank is afterwards expanded to shape.

16. In a glass forming machine, a spindle, a gathering plunger supported at the lower end of the spindle, means comprising inlet and outlet passages in the spindle for circulating a cooling fluid through the plunger, a neck mold positioned about the upper end of the plunger and comprising sections supported on the spindle for movement toward or from one another, means for successively exerting suction and fluid pressure through the spindle and plunger, means for opening and closing the neck mold comprising a sleeve slidably keyed on the spindle and connections between the sleeve and the mold sections, means for reciprocating the spindle, and means for rotating the spindle comprising a gear on the sleeve, and a continuously rotated gear mounted independently of the spindle with which gear the spindle gear meshes when the spindle is elevated.

17. In combination with a pool of molten glass, a blank gatherer and former, means for partially projecting the gatherer into the pool and withdrawing it therefrom, means for controlling the relative temperatures of the gatherer and glass so that a blank of controlled dimensions will be removably formed within the pool on the exterior of the gatherer, means for expanding the blank, a sectional mold, and means for moving the mold into position about the blank and withdrawing it therefrom.

18. In combination with a pool of molten glass, a blank gatherer and former, means for partially projecting the gatherer into the pool and withdrawing it therefrom, means for controlling the relative temperatures of the gatherer and glass so that a blank of controlled dimensions will be removably formed within the pool on the exterior of the gatherer, means for expanding the blank, a sectional mold, means for moving the mold into position about the blank and withdrawing it therefrom, and means for removing the formed glass article.

19. In combination with a pool of molten glass, a blank gatherer and former, means for partially projecting the gatherer into the pool and withdrawing it therefrom, means for controlling the relative temperatures of the gatherer and glass so that a blank of controlled dimensions will be removably formed within the pool on the exterior of the gatherer, means for expanding the blank, a sectional mold, means for moving the mold into position about the blank and withdrawing it therefrom with the formed glass article therein, and means for receiving and disposing of the formed article from the mold as the mold sections are separated.

20. In combination with a pool of molten glass, a blank gatherer and former comprising a plunger and a neck mold, means for lowering and raising the gatherer to partially immerse the plunger in the pool and gather a hollow glass blank on the exterior of the submerged plunger and bring the neck mold adjacent the surface of the pool, means for drawing molten glass from the pool into the neck mold to form the upper portion of the blank, means for controlling the temperature of the plunger, means for elevating the plunger out of engagement with the interior of the blank, means for expanding the blank, a sectional blow mold, and means for moving the mold into position about the blank below the neck mold.

21. In combination with a pool of molten glass, a blank gatherer and former comprising a plunger and a neck mold, means for lowering and raising the gatherer to partially immerse the plunger in the pool and gather a hollow glass blank within the pool on the exterior of the plunger, means for drawing molten glass from the pool into the neck mold to form the upper portion of the blank, means for controlling the temperature of the plunger, means for elevating the plunger out of engagement with the interior of the blank, means for expanding the blank, a sectional blow mold, means for moving the mold into position about the blank below the neck mold, and means for opening the neck mold to release the blown glass article.

22. In combination, a rotatable spindle, a glass working head carried at the lower end of the spindle, means for rotating the spindle, a carriage having bearings in which the spindle is rotatable, a relatively fixed slideway in which the carriage is vertically movable, means for reciprocating the carriage, there being separate fluid supply passages in the spindle leading to the working head, a distributing head carried by the upper portion of the carriage, flexible fluid supply conduits leading to the distributing head, a plurality of sealed non-rotary fluid supply chambers mounted on the carriage in which the upper portion of the spindle is rotatable, there being ports in the spindle individually connecting each passage in the spindle with one of the chambers, and conduits connecting the separate chambers with the distributing head.

23. In combination, a rotatable spindle, a glass working head carried at the lower end of the spindle, a carriage having bearings in which the spindle is rotatably supported, a rack, a fixed slideway in which the rack is mounted for vertical reciprocation, means for reciprocating the rack, means for adjustably mounting the carriage on the rack, and means for locking the carriage to the rack in adjusted position comprising overlapping ears on the rack and carriage respectively, and a rotary pin having eccentrically disposed cylindrical portions journaled in the respective ears.

24. In combination, a rotatable spindle, a glass working head carried at the lower end of the spindle, a carriage having bearings in which the spindle is rotatably supported, means for reciprocating the carriage vertically, means for rotating the spindle, a cylindrical drum mounted concentrically on the spindle adjacent the head, and a plurality of fixed guide rollers between which the drum is positioned when the spindle is elevated.

25. In combination a rotatable spindle, a glass working head carried at the lower end of the spindle, means for rotating the spindle, a rack, a slideway in which the rack is vertically movable, bearings on the rack in which the spindle is rotatably mounted, and means for reciprocating the rack comprising a gear meshing with the rack, a driving member, means for oscillating the driving member, clutch mechanism for establishing connection between the driving member and gear, and means for actuating the clutch at predetermined intervals.

26. In combination a rotatable spindle, a glass working head carried at the lower end of the spindle, means for rotating the spindle, a rack, a slideway in which the rack is vertically movable, bearings on the rack in which the spindle is rotatably mounted, and means for reciprocating the rack comprising a gear meshing with the rack, a driving member, a cam-operated rack for oscillating the driving member, clutch mechanism for connecting the driving member and gear for simultaneous movement, and cam-operated means for actuating the clutch.

27. In combination, a spindle, a glass working head carried at the lower end of the spindle, a rack, a slideway in which the rack is vertically movable, means on the rack for supporting the spindle, a gear meshing with the rack, a rotatable driving member positioned adjacent the gear, a fixed frame member positioned adjacent the gear, means for alternately rotating the driving member in opposite directions, a clutch member shiftable between the alternative positions, in one of which positions it locks the gear to the driving member and in the other to the fixed frame member, and means for shifting the clutch between selected rotations of the driving member.

28. In combination, a spindle, a glass working head carried at the lower end of the spindle, a rack, a slideway in which the rack is vertically movable, means on the rack for supporting the spindle, a gear meshing with the rack, a rotatable driving member positioned adjacent the gear, a fixed frame member positioned adjacent the gear, a clutch member shiftable between two alternative positions, in one of which positions it locks the gear to the driving member and in the other to the fixed frame member, means comprising a rotary cam for alternately rotating the driving member in opposite directions, means comprising a second rotary cam for shifting the clutch member, and means for rotating the two cams so that the first mentioned cam will make a plurality of rotations while the second cam is making one rotation.

29. In combination a rotatable spindle, a glass working head carried at the lower end of the spindle, means for rotating the spindle, a rack, a slideway in which the rack is vertically movable, bearings on the rack in which the spindle is rotatably mounted, and means for reciprocating the rack comprising a gear meshing with the rack, a driving member, a pinion connected with the driving member, a second rack meshing with the pinion, a rotary cam for reciprocating the second rack, clutch mechanism for connecting the driving member and gear for simultaneous rotation, a cam rotating in timed relation to the first mentioned cam, and means operated by the second cam for actuating the clutch mechanism.

30. In combination a rotatable spindle, a glass working head carried at the lower end of the spindle, means for rotating the spindle, a rack, a slideway in which the rack is vertically movable, bearings on the rack in which the spindle is rotatably mounted, and means for reciprocating the rack comprising a gear meshing with the rack, a driving member, a pinion connected with the driving member, a second rack meshing with the pinion, a rotary cam for reciprocating the second rack, clutch mechanism for either connecting the driving member and gear for simultaneous rotation or for locking the gear to a fixed member, a cam rotating in timed relation to the first mentioned cam, and means operated by the second cam for actuating the clutch mechanism.

31. In combination a rotatable spindle, a glass working head carried at the lower end of the spindle, means for rotating the spindle, a rack, a slideway in which the rack is vertically movable, bearings on the rack in which the spindle is rotatably mounted, means for normally reciprocating the rack comprising a train of gearing including a gear meshing with the rack, a normally closed clutch in this train of gearing, means for opening this clutch, and auxiliary means for elevating the rack comprising an auxiliary gear meshing with the rack, auxiliary means for rotating this latter gear, normally open clutch means between the auxiliary rotating means and the auxiliary gear, and a locking ratchet mechanism connected with the auxiliary rotating means to hold the rack when elevated.

32. In combination a rotatable spindle, a glass working head carried at the lower end of the spindle, means for rotating the spindle, a rack, a slideway in which the rack is vertically movable, bearings on the rack in which the spindle is rotatably mounted, and means for reciprocating the rack comprising a gear meshing with the rack, a driving member, a pinion, a clutch connecting the pinion with the driving member, a second rack meshing with the pinion, clutch mechanism for connecting the driving member and gear for simultaneous rotation, cam mechanism for operating the second rack and the second clutch mechanism, auxiliary means for elevating the first rack comprising a gear meshing with this rack, means for rotating the last mentioned gear, means for moving the last mentioned rotating means into engagement with the last mentioned gear, and means for preventing reverse rotation of the last mentioned means.

33. In combination with a tank for holding molten glass, said tank having a draw opening in the top thereof, a glass forming machine comprising a plunger reciprocable through said opening, and a carriage on which the machine parts are mounted, the carriage comprising supporting wheels, a supporting frame comprising spaced apart uprights, elevated substantially horizontal beams carried by the uprights, tracks on the beams for movably supporting the wheels, a bracket mounted on one of the beams, a stop adjustably mounted in the bracket for engaging one of the wheels to limit movement of the carriage in one direction, and a clamp carried by the bracket and engaging the wheel to hold the carriage in adjusted position against the stop.

34. In a machine for forming glass articles comprising a reciprocating gathering device adapted to be projected downwardly into a pool of molten glass and gather a suspended glass blank therefrom, a cut-off device positioned between the gathering device and the pool adapted to sever the trailing glass from the blank, and an air jet positioned between the cut-off device and the surface of the pool and operable to blow the cut-off glass to one side of the gathering position in the pool.

35. In a machine for forming glass articles, in combination with a device for suspending a glass blank, a supporting frame, a shaft rotatably mounted in the frame and having a pair of oppositely threaded portions, a pair of nuts one mounted on each threaded portion of the shaft, a mold-carrying frame pivotally mounted on the shaft to swing independently thereof, a pair of mold sections mounted in the mold-carrying frame to move toward or from one another, connections between the nuts and sections for opening or closing the mold as the shaft is rotated to move the nuts toward and from one another, and independently operable means for rotating the shaft and swinging the mold carrying frame about the shaft.

36. In a machine for forming glass articles, in combination with a device for suspending a glass blank, a supporting frame, a shaft rotatably mounted in the frame and having a pair of oppositely threaded portions, a pair of nuts one mounted on each threaded portion of the shaft, a mold-carrying frame pivotally mounted on the shaft, a pair of mold sections mounted in the mold-carrying frame to move toward or from one another, connections between the nuts and sections for opening or closing the mold as the shaft is rotated to move the nuts toward or from one another, a pinion secured on the shaft, a pinion secured to the mold carrying frame, a pair of racks one meshing with each pinion, and means for reciprocating the racks in timed relation to each other.

37. In a machine for forming glass articles, in combination with a device for suspending a glass blank, a supporting frame, a shaft rotatably mounted in the frame and having a pair of oppositely threaded portions, a pair of nuts one mounted on each threaded portion of the shaft, a mold-carrying frame pivotally mounted on the shaft, a pair of mold sections mounted in the mold-carrying frame to move toward or from one another, connections between the nuts and sections for opening or closing the mold as the shaft is rotated to move the nuts toward or from one another, a pinion secured on the shaft, a pinion secured to the mold carrying frame, a pair of racks one meshing with each pinion, and a rotary cam means for reciprocating the racks in timed relation to each other.

38. In a machine for forming glass articles, in combination with a device for suspending a glass blank, a supporting frame, a shaft rotatably mounted in the frame and having a pair of oppositely threaded portions, a pair of nuts one mounted on each threaded portion of the shaft, a mold-carrying frame pivotally mounted on the shaft, a pair of mold sections mounted in the mold-carrying frame to move toward or from one another, connections between the nuts and sections for opening or closing the mold as the shaft is rotated to move the nuts toward and from one another, independently operable means for rotating the shaft and swinging the mold carrying frame, and adjustable means for aligning the mold sections when closed with the device for suspending the blank.

39. In a machine for forming glass articles, in combination with a device for suspending a glass blank, a supporting frame, a shaft rotatably mounted in the supporting frame and having a pair of oppositely threaded portions, a pair of nuts one mounted on each threaded portion of the shaft, the nuts being slidably keyed to the frame to prevent rotation of the nuts and cause them to be moved toward or from one another as the shaft is rotated, a mold-carrying frame pivoted on the shaft, a pair of mold sections pivotally mounted in the mold-carrying frame to swing toward or from one another, a pair of operating levers, each lever being intermediately pivoted in the mold-carrying frame and connected at its respective ends to one of the mold sections and to one of the nuts, a sleeve rotatably mounted on the shaft and keyed to the mold-carrying frame, and means for independently rotating the sleeve and the shaft.

40. In a machine for forming glass articles, in combination with a device for suspending a glass blank, a supporting frame, a shaft rotatably mounted in the supporting frame and having a pair of oppositely threaded portions, a pair of nuts one mounted on each threaded portion of the shaft, the nuts being slidably keyed to the frame to prevent rotation of the nuts and cause them to be moved toward or from one another as the shaft is rotated, a mold-carrying frame pivoted on the shaft, a pair of mold sections pivotally mounted in the mold-carrying frame to swing toward or from one another, a pair of operating levers, each lever being intermediately pivoted in the mold-carrying frame and connected at its respective ends to one of the mold sections and to one of the nuts, a sleeve rotatably mounted on the shaft and keyed to the mold-carrying frame, a pinion on the sleeve, a pinion on the shaft, a pair of racks one meshing with each pinion and means for reciprocating the racks in timed relation to each other.

41. In a machine for forming glass articles, a vertically movable rotatable spindle for gathering and suspending a glass blank, a relatively fixed bracket, guide means on the bracket for centering the spindle when in elevated position, a mold comprising a pair of sections mounted to swing toward or from one another to closed or open positions, means for moving the mold into position beneath the spindle and for opening and closing the sections, and means carried by the bracket for aligning the closed sections with the spindle.

42. In a machine for forming glass articles, a vertically movable rotatable spindle for gathering and suspending a glass blank, a relatively fixed bracket, guide means on the bracket for centering the spindle when in elevated position, a mold comprising a pair of sections mounted to swing toward or from one another to closed or open positions, means for moving the mold into position beneath the spindle and for opening and closing the sections, an adjustable centering pin carried by the bracket, and means on the mold sections for engaging the pin to align the closed mold with the spindle.

43. In a machine for forming glass articles, in combination with a device for suspending and blowing a glass blank, a mold mechanism comprising a pair of mold sections movable toward or from one another to closed or open positions, means for supporting the mold sections to swing about a horizontal axis, means for swinging the mold and operating the sections from a closed position about the blank to an inverted open position at one side of the suspending device, and a takeout device comprising a tiltable chute positioned to receive a finished glass article as the mold is swung down from closed blowing position and opened, and means for subsequently tilting the chute upward to discharge the article.

44. In a machine for forming glass articles, in combination with a device for suspending and blowing a glass blank, a mold mechanism comprising a pair of mold sections movable toward or from one another to closed or open positions, means for supporting the mold sections to swing about a horizontal axis, means for swinging the mold and operating the sections from a closed position about the blank to an inverted open position at one side of the suspending device, and means for spraying a cooling fluid into the mold sections when in open position.

45. In a machine for forming glass articles, in combination with a device for suspending and blowing a glass blank, a mold mechanism comprising a pair of mold sections movable toward or from one another to closed or open positions, means for supporting the mold sections to swing about a horizontal axis, means for swinging the mold and operating the sections from a closed position about the blank to an inverted open position at one side of the suspending device, and a pair of similar spraying devices positioned to discharge a cooling fluid into the respective mold sections when the sections are moved to inverted open position.

46. In a machine for forming glass articles, in combination with a device for suspending and blowing a glass blank, a mold mechanism comprising a pair of mold sections movable toward or from one another to closed or open positions, means for supporting the mold sections to swing about a horizontal axis, means for swinging the mold and operating the sections from a closed position about the blank to an inverted open position at one side of the suspending device, means for spraying a cooling fluid into the respective mold sections when in open position and automatic valve mechanism for operating the spraying mechanism in timed relation to the movements of the mold.

47. Apparatus for forming an initially hollow glass blank closed at its sides and bottom of predetermined wall thickness within a pool of molten glass and withdrawing the blank from the pool, comprising an interior form for the blank, means for lowering the form into the pool and withdrawing it therefrom with a predetermined dwell within the pool, means for interiorly cooling the form, means for forming an open neck portion on the blank adjacent the surface of the pool and for lifting the blank from the pool, and means for lifting the form from contact with the interior of the blank.

48. Apparatus for forming an initially hollow glass blank closed at its sides and bottom of predetermined wall thickness within a pool of molten glass and withdrawing the blank from the pool, comprising an interior form for the blank, means for lowering the form into the pool and withdrawing it therefrom, means for interiorly cooling the form, means for controlling the rate at which the form is withdrawn from the pool, means for forming an open neck portion on the blank adjacent the surface of the pool and for lifting the blank from the pool, and means for lifting the form from contact with the interior of the blank.

49. Apparatus for forming an initially hollow glass blank of substantially predetermined wall thickness within a pool of molten glass and withdrawing the blank from the pool, comprising a plunger and means for projecting the plunger into the pool and withdrawing it therefrom, the blank being formed within the pool on the exterior surface of the plunger, the plunger being hollow with heat conducting walls, and means for circulating a fluid through the plunger to quickly remove heat from the plunger and the surrounding glass.

50. Apparatus for forming an initially hollow glass blank of substantially predetermined wall thickness within a pool of molten glass and withdrawing the blank from the pool, comprising a plunger and means for projecting the plunger into the pool and withdrawing it therefrom, the blank being formed within the pool on the exterior surface of the plunger, the plunger being tapered downwardly and hollow with heat conducting walls, and means for circulating a fluid through the plunger to quickly remove heat from the plunger and the surrounding glass.

51. Apparatus for forming an initially hollow glass blank of substantially predetermined wall thickness within a pool of molten glass and withdrawing the blank from the pool, comprising a plunger and means for projecting the plunger into the pool and withdrawing it therefrom, the blank being formed within the pool on the exterior surface of the plunger, the plunger being hollow with heat conducting walls, means for circulating a fluid through the plunger to quickly remove heat from the plunger and the surrounding glass, and means for exerting suction at the surface of the plunger to assist in holding the blank thereto and lifting the blank from the pool.

52. Apparatus for forming an initially hollow glass blank of substantially predetermined wall thickness within a pool of molten glass and withdrawing the blank from the pool, comprising a plunger and means for projecting the plunger into the pool and withdrawing it therefrom, the blank being formed within the pool on the exterior surface of the plunger, the plunger being hollow with heat conducting walls, means for circulating a fluid through the plunger to quickly remove heat from the plunger and the surrounding glass, there being suction openings formed in the exterior surface of the plunger at selected locations, and means for exerting suction through these openings to assist in holding the blank to the plunger.

53. In a machine for forming glass articles, in combination with a gathering device adapted to be projected downwardly into a pool of molten glass to gather a suspended hollow glass blank, means for reciprocating the gathering device between an upper blowing position and the lower gathering position, a mold movable into position to enclose the sides and bottom of the suspended hollow blank when the gathering device is lifted to its upper blowing position, a cut-off device positioned intermediate the gathering and blowing positions, and means timed with the movements of the gathering device for bringing the cut-off device into cutting position beneath the blank as the gathering device moves upwardly to cut excess glass from the lower closed end of the blank.

54. In a machine for forming glass articles, in combination with a gathering device adapted to be projected downwardly into a pool of molten glass to gather a suspended hollow glass blank, means for reciprocating the gathering device between an upper blowing position and the lower gathering position, a mold movable into position to enclose the sides and bottom of the suspended hollow blank when the gathering device is lifting to its upper blowing position, a cut-off device positioned intermediate the gathering and blowing positions, means timed with the movements of the gathering device for bringing the cut-off device into cutting position beneath the blank as the gathering device moves upwardly to cut excess glass from the lower closed end of the blank, and means for adjusting the position of the cut-off device vertically to vary the amount of glass in the lower end of the blank.

55. In a machine for forming glass articles, in combination with a furnace structure enclosing a pool of molten glass, the structure having a gathering opening in its top wall, a gathering device adapted to be projected downwardly into the pool to gather a suspended hollow glass blank, means for reciprocating the gathering device between an upper blowing position and the lower gathering position, a mold movable into position to enclose the sides and bottom of the suspended hollow blank when the gathering device is in its upper position, a cut-off device positioned adjacent the vertical path of travel of the gathering device and closely above the furnace, and means timed with the movements of the gathering device for bringing the cut-off device into cutting position beneath the blank and above the furnace opening as the gathering device moves upwardly to cut off excess glass from the lower closed end of the blank.

56. In a machine for forming glass articles, in combination with a furnace structure enclosing a pool of molten glass, the structure having a gathering opening in its top wall, a gathering device adapted to be projected downwardly into the pool to gather a suspended hollow glass blank, means for reciprocating the gathering device between an upper blowing position and the lower gathering position, a mold movable into position to enclose the sides and bottom of the suspended hollow blank when the gathering device is in its upper position, a cut-off device positioned adjacent the vertical path of travel of the gathering device and closely above the furnace, and means timed with the movements of the gathering device for bringing the cut-off device into cutting position beneath the blank and above the furnace opening as the gathering device moves upwardly to cut-off excess glass from the lower closed end of the blank, and means for adjusting the position of the cut-off device vertically to vary the amount of glass in the lower end of the blank.

AUGUST KADOW.
WILLARD L. VAN NESS.